United States Patent [19]

Forecast et al.

[11] Patent Number: 5,661,659
[45] Date of Patent: Aug. 26, 1997

[54] INSTRUMENTATION POWER SUPPLY AND READ UNIT FOR TESTING GEARBOXES THROUGH VARIOUS SPEEDS AND GEARS

[75] Inventors: Stanley Frank Forecast, Horwich; Ajay Kumar Sattee, Sale, both of England

[73] Assignee: Eaton Corporation, Cleveland, Ohio

[21] Appl. No.: 744,938

[22] Filed: Nov. 6, 1996

Related U.S. Application Data

[63] Continuation of Ser. No. 233,657, Apr. 26, 1994, abandoned.

[30] Foreign Application Priority Data

May 1, 1993 [GB] United Kingdom ............... 9309086

[51] Int. Cl.$^6$ ........................................ G01R 23/00
[52] U.S. Cl. ..................... 364/484; 364/508; 364/572
[58] Field of Search ................... 364/481–487, 364/508, 551.02, 572–576, 474.17, 474.37

[56] References Cited

U.S. PATENT DOCUMENTS

| | | | |
|---|---|---|---|
| 3,758,758 | 9/1973 | Games et al. | 235/151.3 |
| 4,488,240 | 12/1984 | Kapadia et al. | 364/508 |
| 4,872,337 | 10/1989 | Watts et al. | 364/575 |
| 4,931,949 | 6/1990 | Hernandez et al. | 364/508 |
| 4,980,844 | 12/1990 | Demjanenko et al. | 364/550 |
| 4,988,979 | 1/1991 | Sasaki et al. | 364/508 |
| 4,989,159 | 1/1991 | Liszka et al. | 364/508 |

*Primary Examiner*—James P. Trammell

[57] ABSTRACT

An electronic board for cooperation with a computer and a group of noise measuring instruments, for displaying side by side noise curves for various gear pairs of a gearbox for differing frequencies selected by filter means (15,21,20,17, 19,18,23) in an audio frequency band, to which the human ear is sensitive. A frequency sensitive Fourier analysis is conducted continually at chosen rpm steps spaced over the desired range, in order to produce the curves. Noise inherent in a design of transmission, or only present in isolated samples thereof thereby denoting wear or other defect or damage, can thus be investigated, analyzed and possible remedies applied.

10 Claims, 28 Drawing Sheets

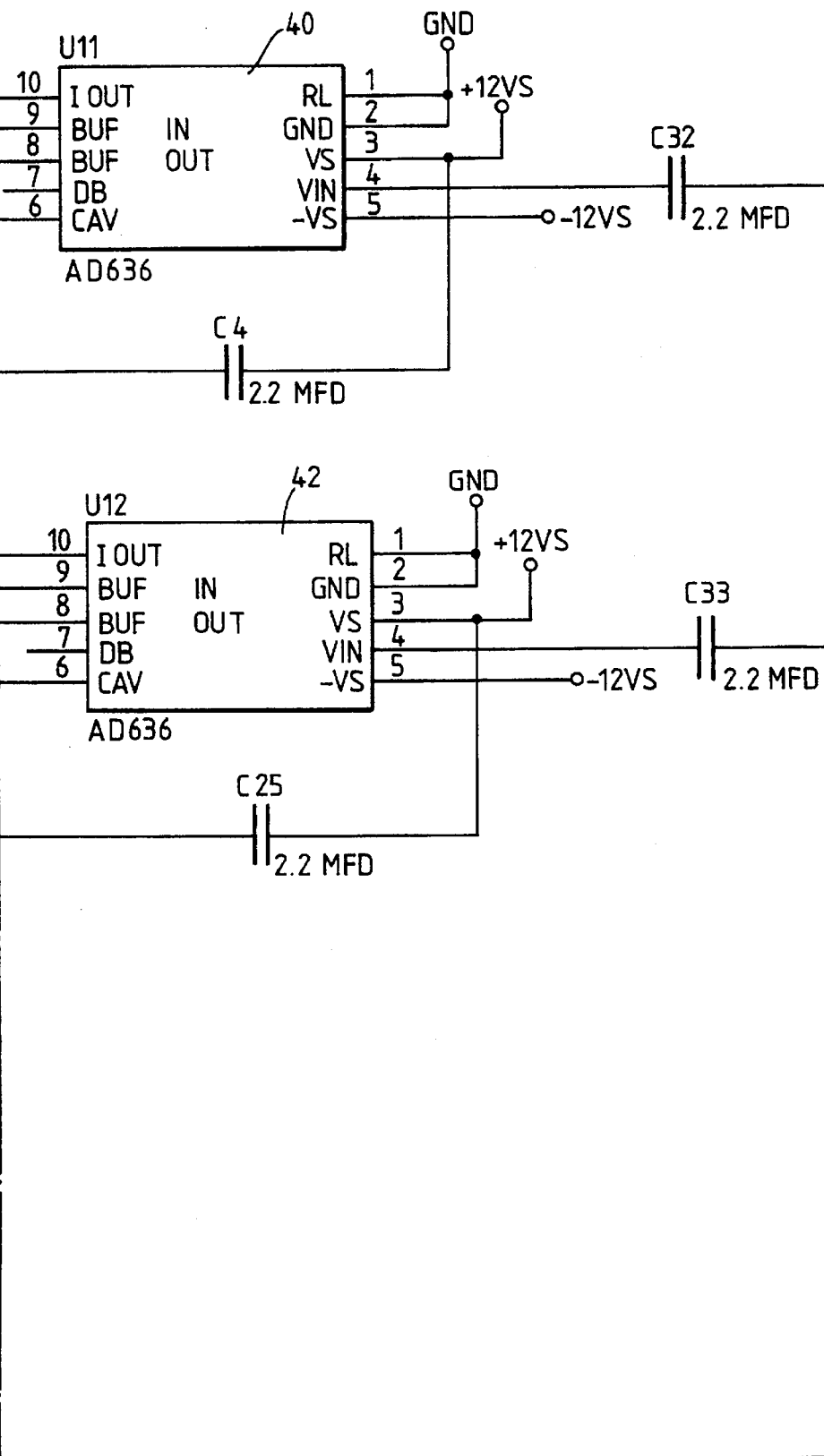

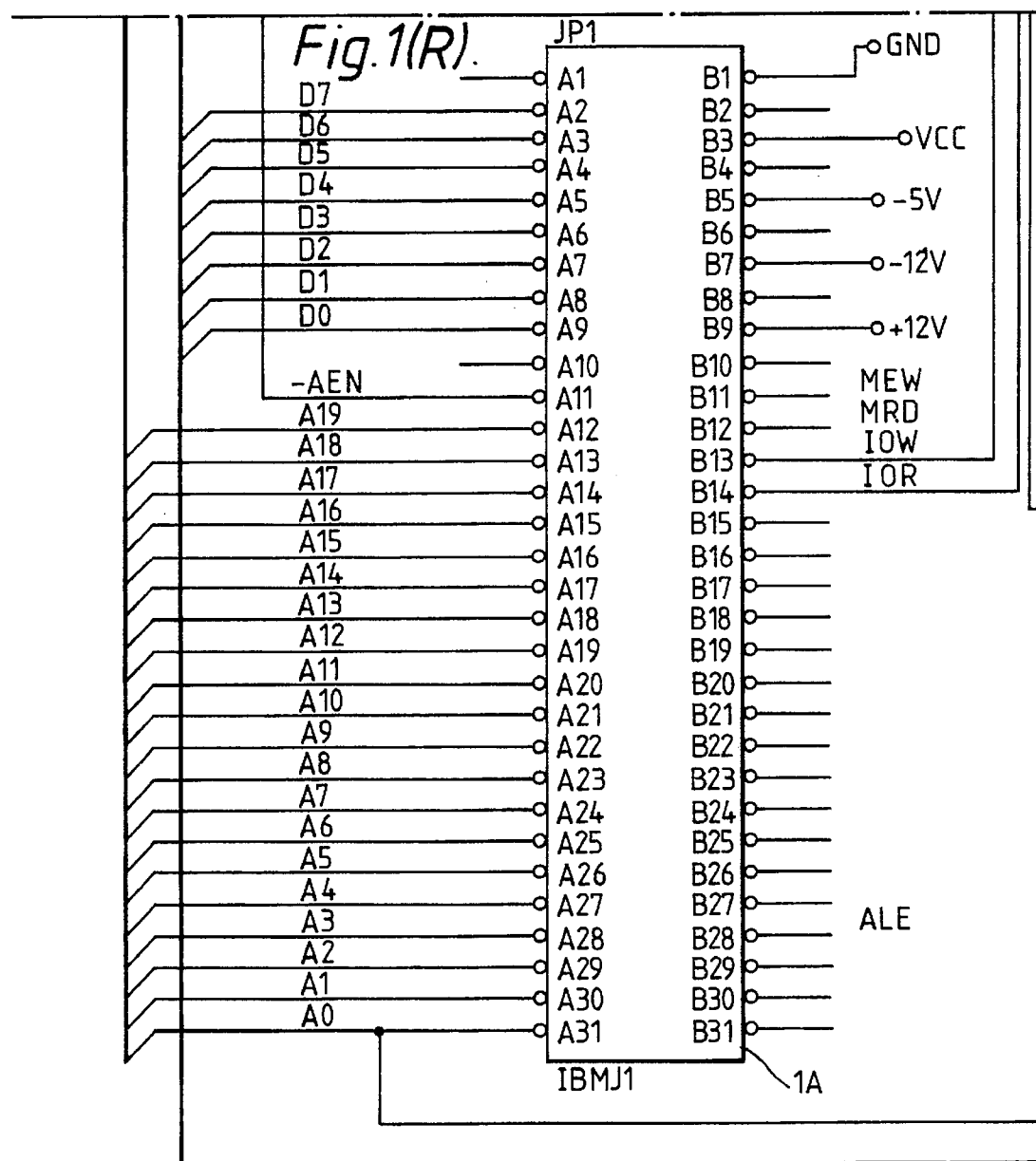
Fig.1(R).
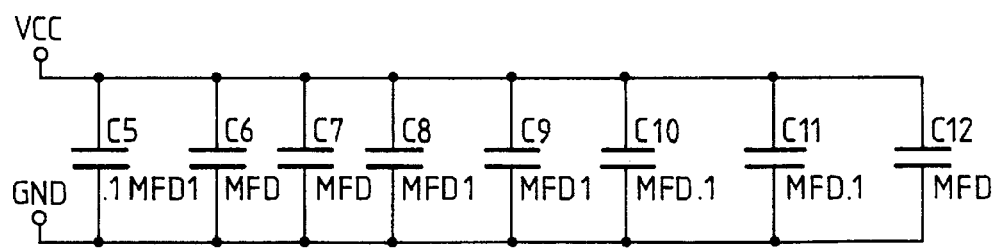

OSC

TRTG1

AN7

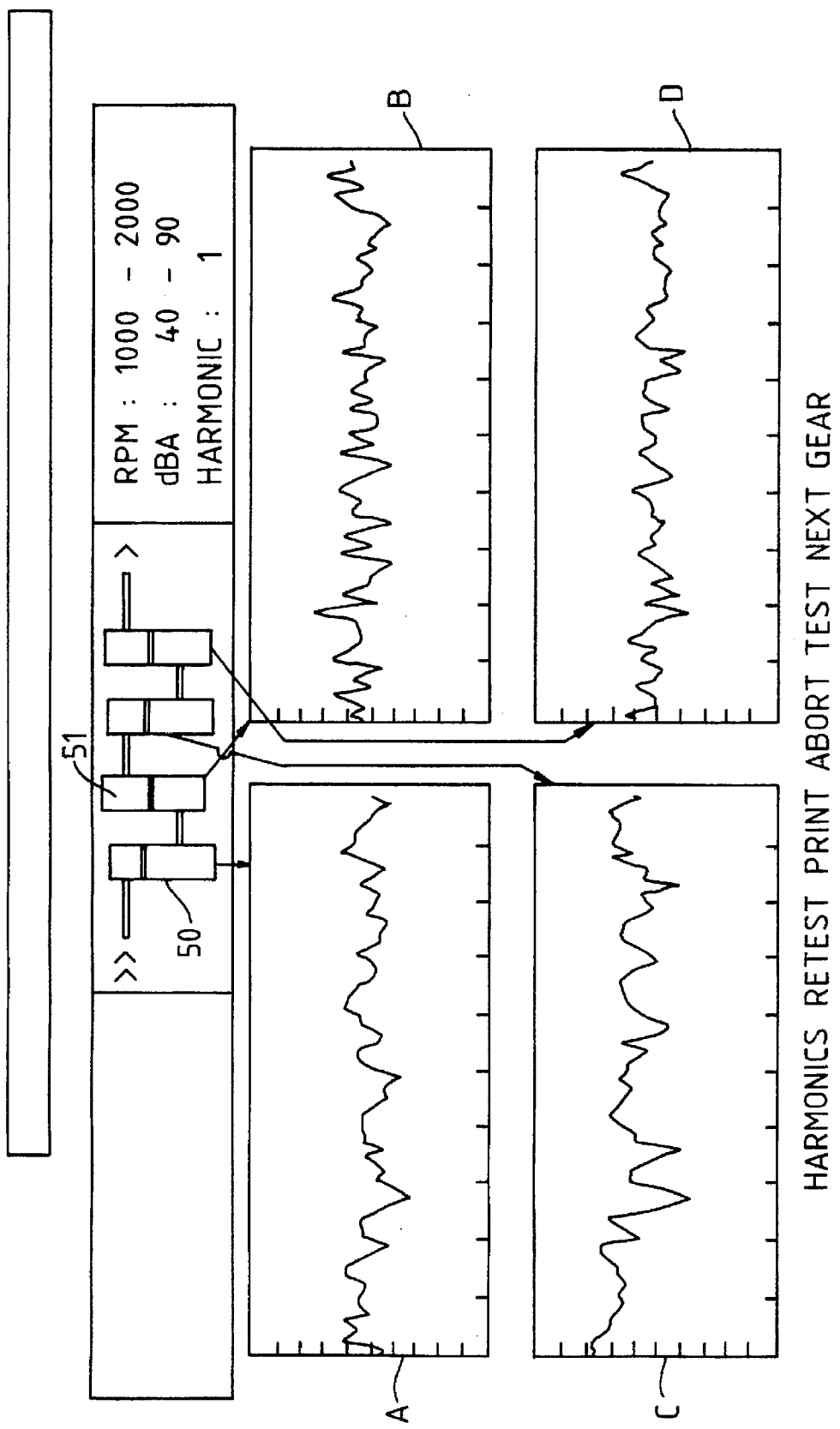
Fig. 2. ORDER PLOT
EACH WINDOW REPRESENTS A DISCRETE GEAR PAIR (COLOUR CODED DISPLAY)

INSTRUMENTATION POWER SUPPLY AND READ UNIT FOR TESTING GEARBOXES THROUGH VARIOUS SPEEDS AND GEARS

This application is a continuation of application Ser. No. 08/233,657 filed on Apr. 26, 1994 now abandoned.

BACKGROUND AND SUMMARY OF THE INVENTION

The present invention relates generally to an electrical circuit, for cooperation with a set of noise sensitive electrical instruments and a computer to provide a stand-alone noise testing device. The circuit, according to a predetermined schedule of actuation or variation, and at predetermined time intervals, accepts and processes output signals from the test instruments for subsequent analysis by the computer.

It is preferred that the present circuit be implemented as a single circuit board, and be locatable as an auxiliary unit in a suitable space or expansion slot of the computer. The circuit itself provides multipath, bi-directional communication, preferably through a single first plug/socket unit connection, with the PC, and further multipath, bi-directional communication, preferably through a single second plug/socket unit connection, with a set of test instruments. Preferably as many functions as possible are allotted to the standard facilities of the interconnected personal computer (PC) so that multi-pin plug and socket means may be used to communicate between the circuit board and the PC. Since various control signals required may be non-standard, these non-standard signals may be generated from unused standard address signals available from most PCs. Certain functions such as a clock, oscillator or keying signal may also be included as part of the present circuit for flexibility in adapting to certain PCs when these have non-standard locations or connector terminals for sources of these signals. The display facilities of the PC can be used to display test data, but the X and Y signals displayed may be analog signals derived either from certain address signals or from the instruments and their controls.

One application of the present invention is testing gearboxes, such as heavy duty truck transmissions, for excessive noise or particular noise characteristics. A principal embodiment of the invention reads instruments, set up to sense varying test conditions in a machine, feeds X-Y signals to the computer for defining graphs, and processes and feeds to the computer signals derived from progressively varying readings of the instruments. The embodiment enables various frequency components to be analyzed, and preferably enables Fourier analyses to be graphed and displayed, stored or printed.

Noise is becoming an increasingly bothersome hindrance to human comfort, and the most irritating frequency components and hence, sources of the noise can often be discovered by signal processing. Prior devices of this type involve the measurement of all noise over a very wide acoustic band, or of a continuous given audio band. A feature of the present invention is to observe noise content selectively at points distributed over a given frequency band, to provide a direct portrayal of the potential nuisance quality of machines, either absolutely, or against a standard display deemed to be satisfactory, at some or all of selected frequencies to which the human ear is found or believed to be sensitive, or finds objectionable.

Alternatively or additionally, a machine being tested may have known resonances or cyclic running patterns, e.g. gear tooth meshings, in which case the tests can be directed mainly at specific frequency components and harmonics, or just to selections of these harmonics which are most objectionable to the human ear. Computer power and time are saved if observations of such predictable fundamentals and higher or lower order harmonics and sub-harmonics are focused on. For instance, it is possible to predict the audible frequencies to be expected from a heavy vehicle transmission having a certain number of teeth, ratios and stages, run at various typical or test speeds, under certain controlled torque conditions.

The invention thus provides an auxiliary circuit unit having a first bi-directional multi-path communication connection associated with or mounted thereon, to communicate address words, sensed and quantized instrument data for the displaying signals, and other data or control signals for the instruments. Means to generate supply signals for the measurement instruments and for controlled operation of the signal sources may also be included, such sources being typically noisy machines to be measured. Means are provided to process the instrument output data for communication to the computer via the first communication means. A second bi-directional multi-path communication connection associated with or mounted also on the unit is provided to communicate the control and readout signals between the unit and the instruments or the noise sources.

The signals to be measured henceforth will be referred to as "noise" signals. Such noise may be interesting from a point of view of legal or humanly bearable limits, or from the point of view of detecting breakages, damaged teeth, or over-stressed mechanical parts in a transmission. One preferred test procedure suitable for a factory environment, to test heavy goods vehicle transmissions for excessive noise, the international standards for which are becoming ever more stringent, is the following. The skilled man will readily adapt such tests for different transmissions or machines.

(a) rms (root mean square) noise is measured against rpm (revolutions per minute) at certain required intervals; for example, for intervals of 20 rpm from a minimum 1000 to a maximum 2000 rpm range, and at one or more given torques or for varying torques:

(b) a frequency Fourier analysis is computed in order to ascertain various frequency components contributing unduly to output noise:

(c) these frequency components are measured at 512 frequency steps of 11 Hz, from the very low to 6000 Hz, above which the human ear is less sensitive, the chosen frequency range preferably generally being a compromise, to avoid requirement for excessive testing:

(d) the response curve to these frequencies up to the 6000 Hz limit may be shaped, using an input A-weighted filter, or one similar in sensitivity to that of the average human ear:

(e) the rpm range is a similarly chosen compromise, in that heavy diesel engines rotate predominantly within this range, and often the numbers of teeth and the speed of relative movement of these teeth when in mesh, can be used, calculated, measured or compared to predict where excessive noise is likely:

(f) having regard to the known propensity for a particular gearbox model, a standard response curve for a good sample is compared with that of the test sample, for each rpm speed, frequency component and torque of interest:

(g) since most noises are highly frequency dependent due to meshing and unmeshing of cogs with known numbers of teeth and ratios thereof, noise components at these frequencies may be exclusively or mainly investigated, such as by opening windows using appropriate software. For instance we may predict and identify, based on theory for one particular ratio the mesh frequencies of each pair of meshed gears:

(h) excessive noise amplitudes at certain orders can suggest certain faults, damage, over-stress, or distortions which can be individually attended to, or can be motive for rejecting a component, without any necessity to inspect an entire machine:

(i) it should be remembered that most gearboxes seem not to give significant, at least as far as the human ear is concerned, noise components above 4000 Hz, even at high revolution rates, but there may well be many exceptions; the experience of 4000 Hz being a practical ceiling for appreciable noise, is a motivation for investigating components only up to 6000 Hz:

(j) any of these analyses may be preferably performed for one or more typical or highest torques, for each one of 18 or so gear ratios engaged:

(k) when predicting theoretically, presently preferred is to "consider" the fundamental and the next three harmonics; by "consider" we mean as analyzed at the 512 discreet frequencies.

It is often desirable that some of the various parameters such as rpm be swept through quite rapidly, preferably not continuously, but in steps, which can be regular intervals or chosen steps where resonances are anticipated or already measured once, or associated with a particular design; and computer measurements and Fourier analyses registered and stored, for examination off-site, after the machinery has been stopped.

A single board embodiment of the present invention will now be described, designed for incorporation into a PC in order to cooperate therewith to provide a self-sufficient noise testing apparatus, which can provide a Fourier analysis and easily read indications of pass or fail without requirement for detailed portrayal of the intermediate analyses.

Other advantages and features of this invention will become apparent form the following specification taken in conjunction with the accompanying drawings.

BRIEF DESCRIPTION OF THE DRAWINGS

FIG. 2 shows noise measurement curves for each of four meshings in a constant mesh gearbox.

DETAILED DESCRIPTION OF A PREFERRED EMBODIMENT

Figure 1:
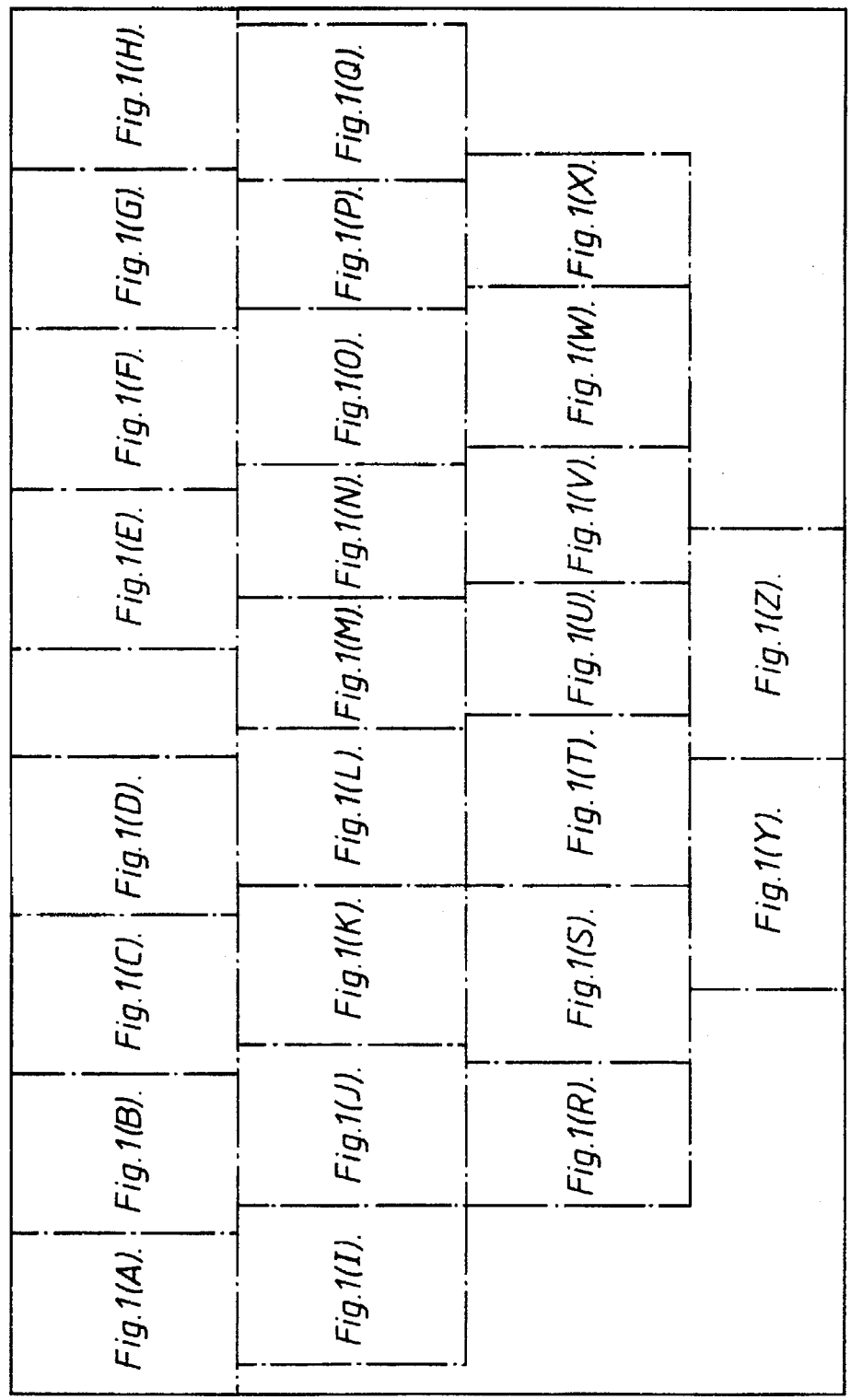
FIGS. 1 (A)–1(Z) which should be placed as shown in FIG. 1, form a schematic diagram of the circuit of the present invention with FIGS. 1(Y) and 1 (Z) schematically illustrating an optional ac to dc converter circuit.
Figure 1A:
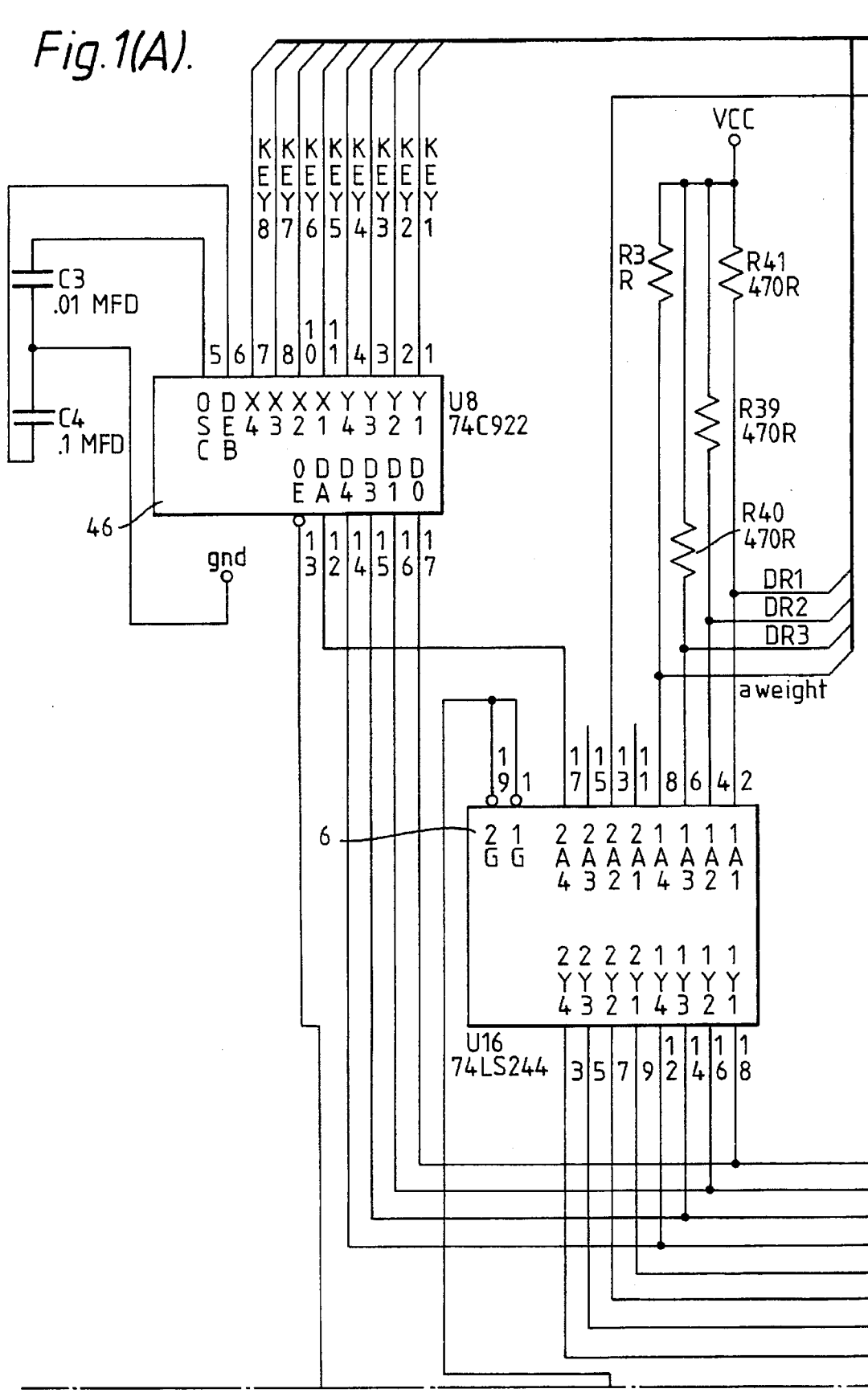
Figure 1B:
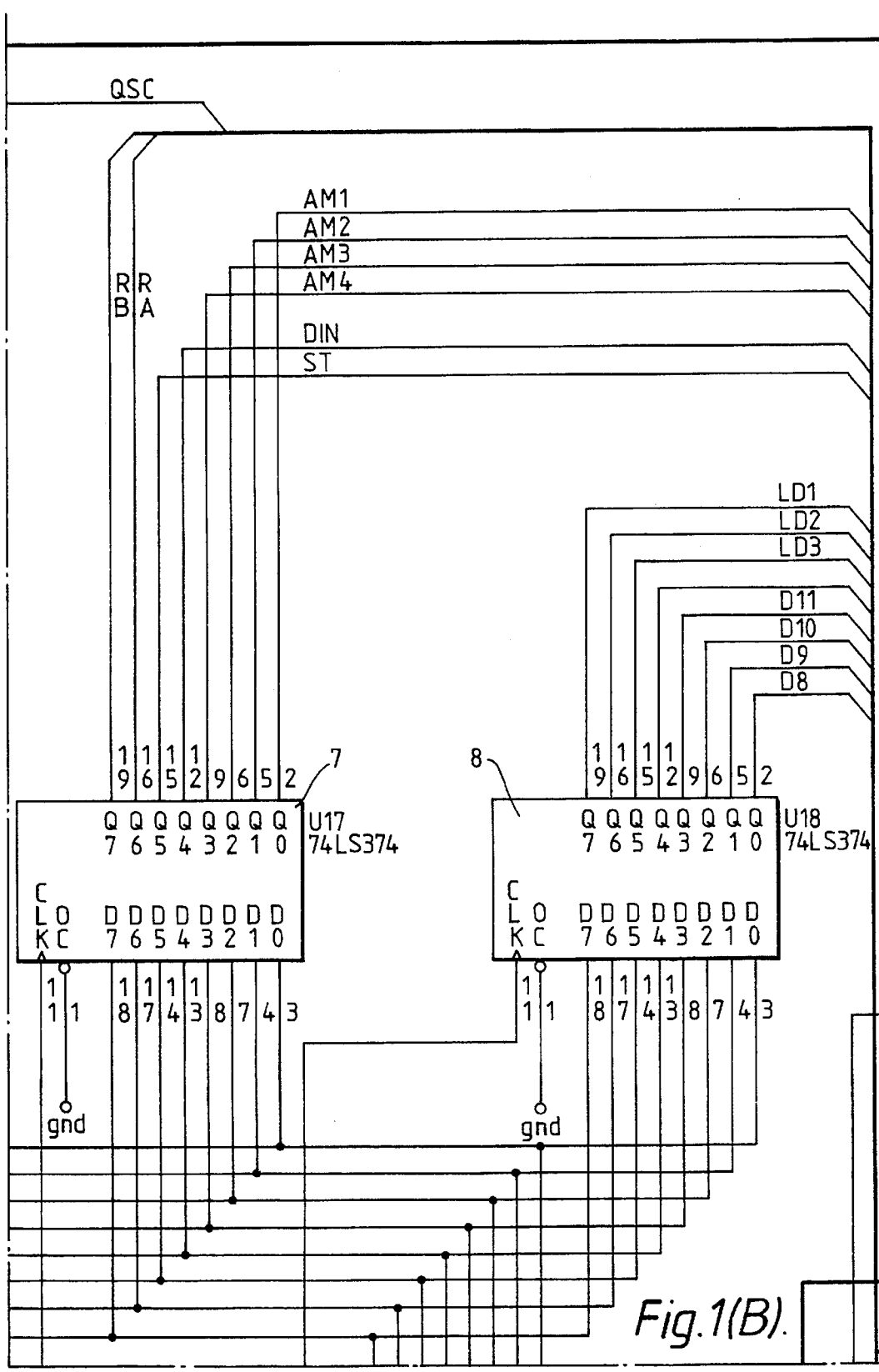
Figure 1C:
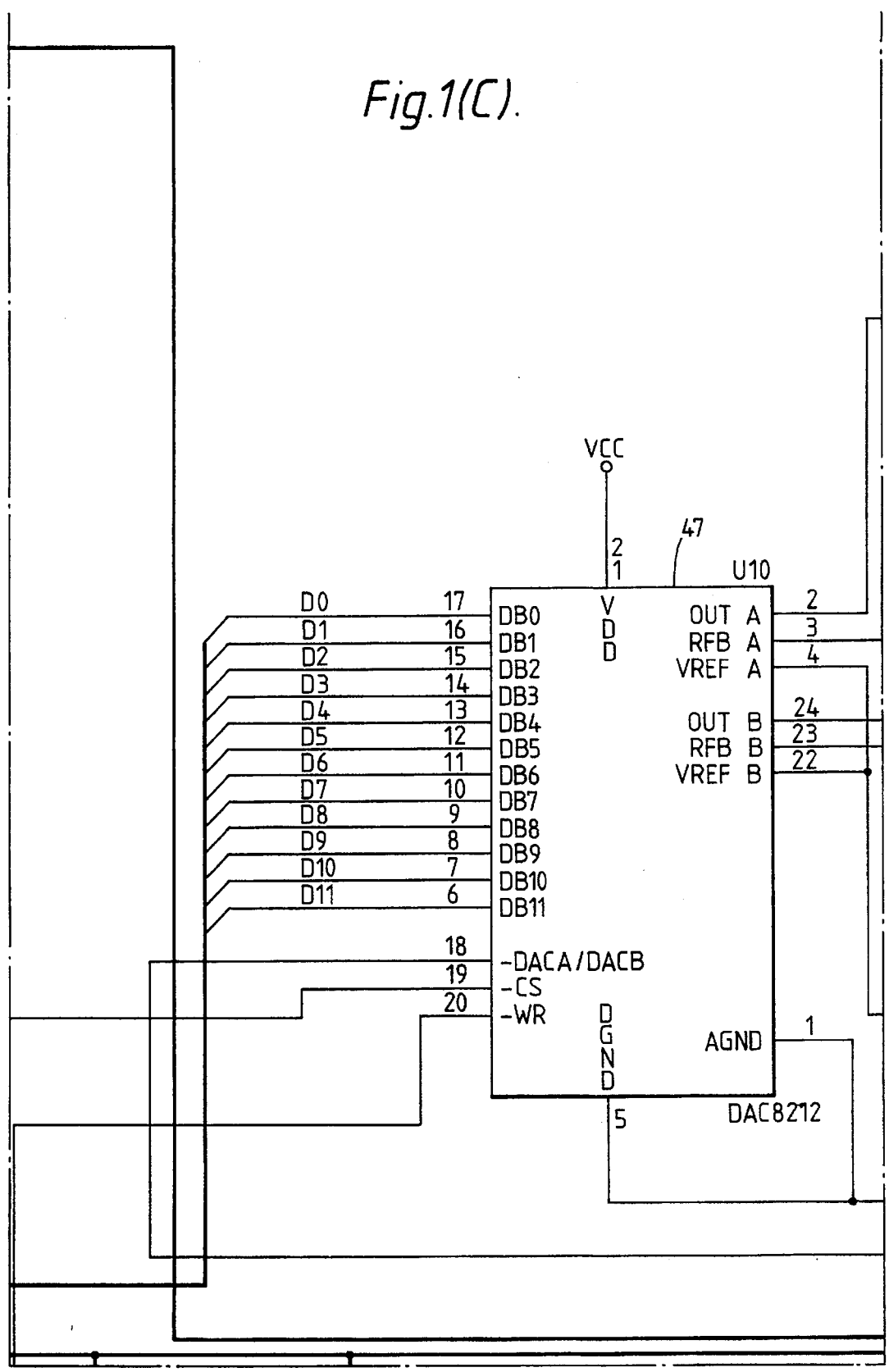
Figure 1D:
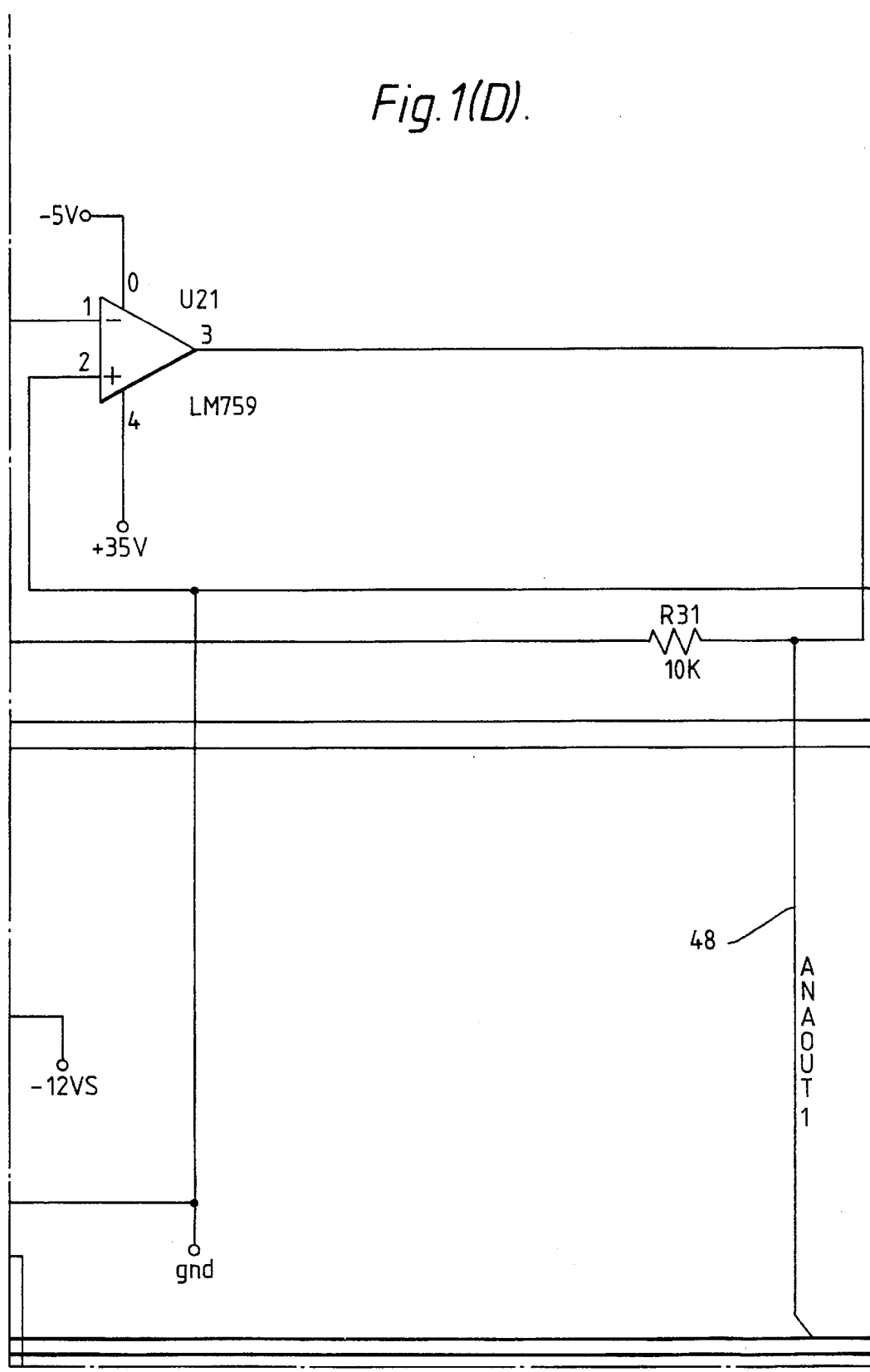
Figure 1E:
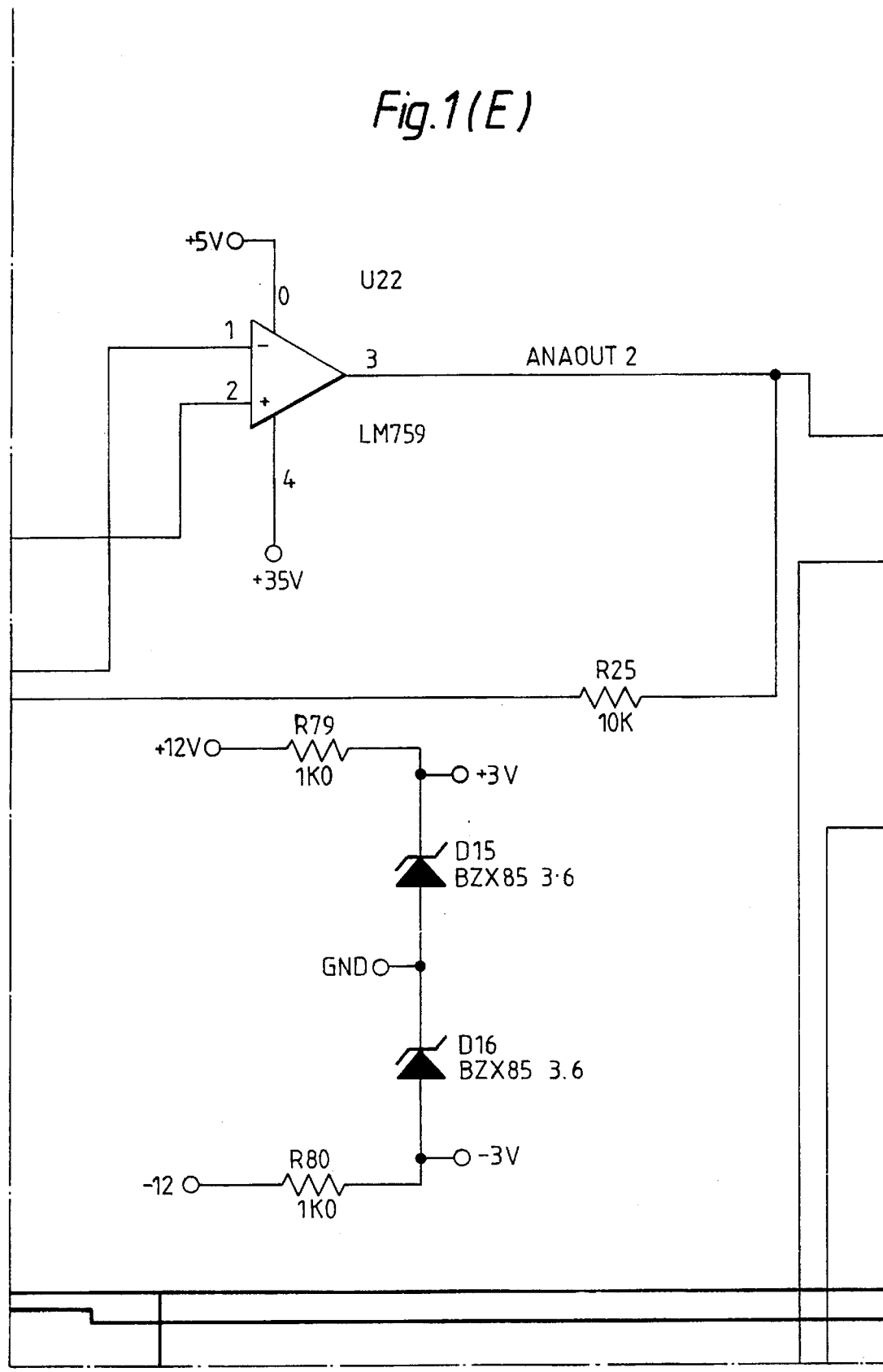
Figure 1F:
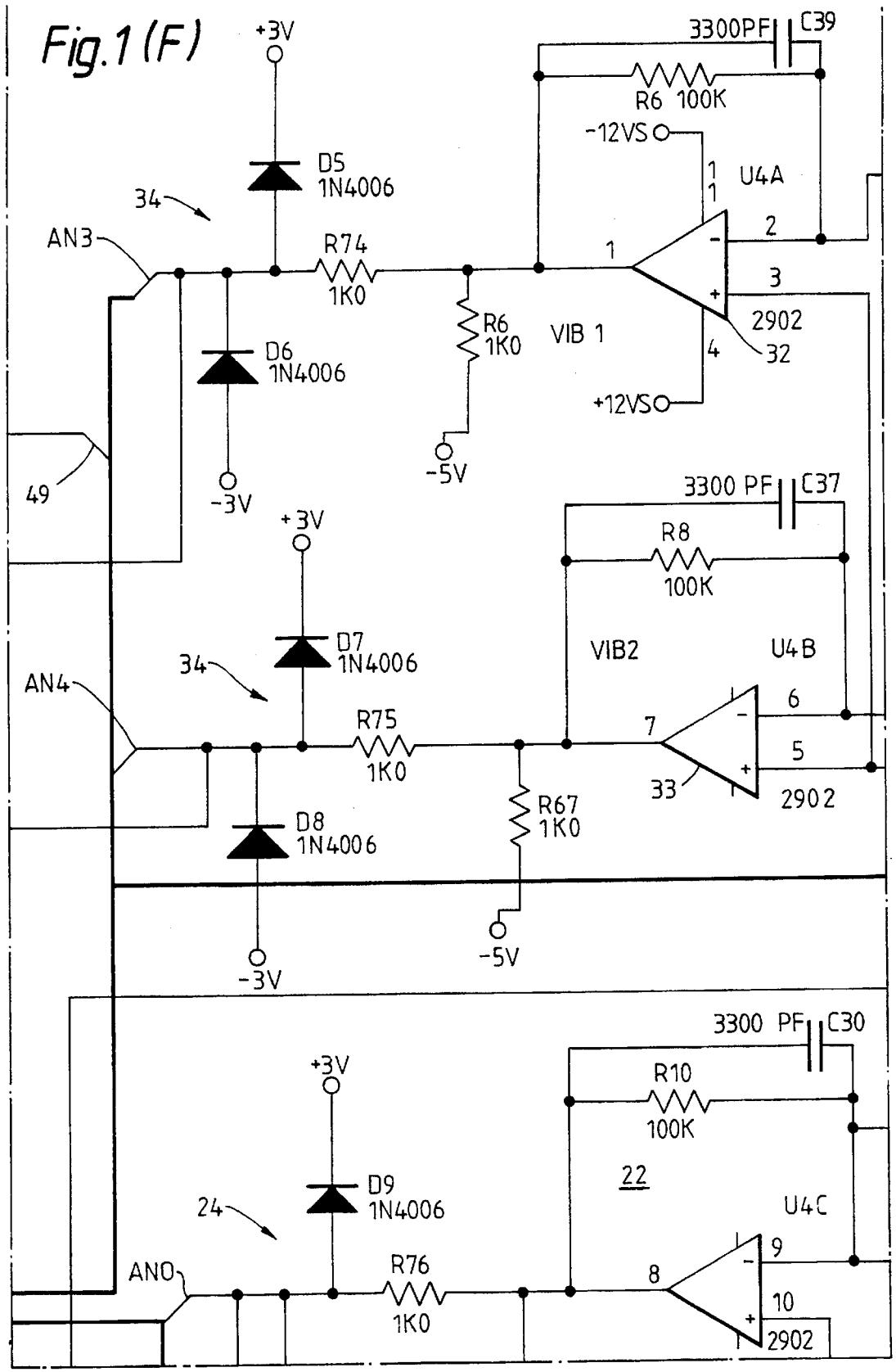
Figure 1:
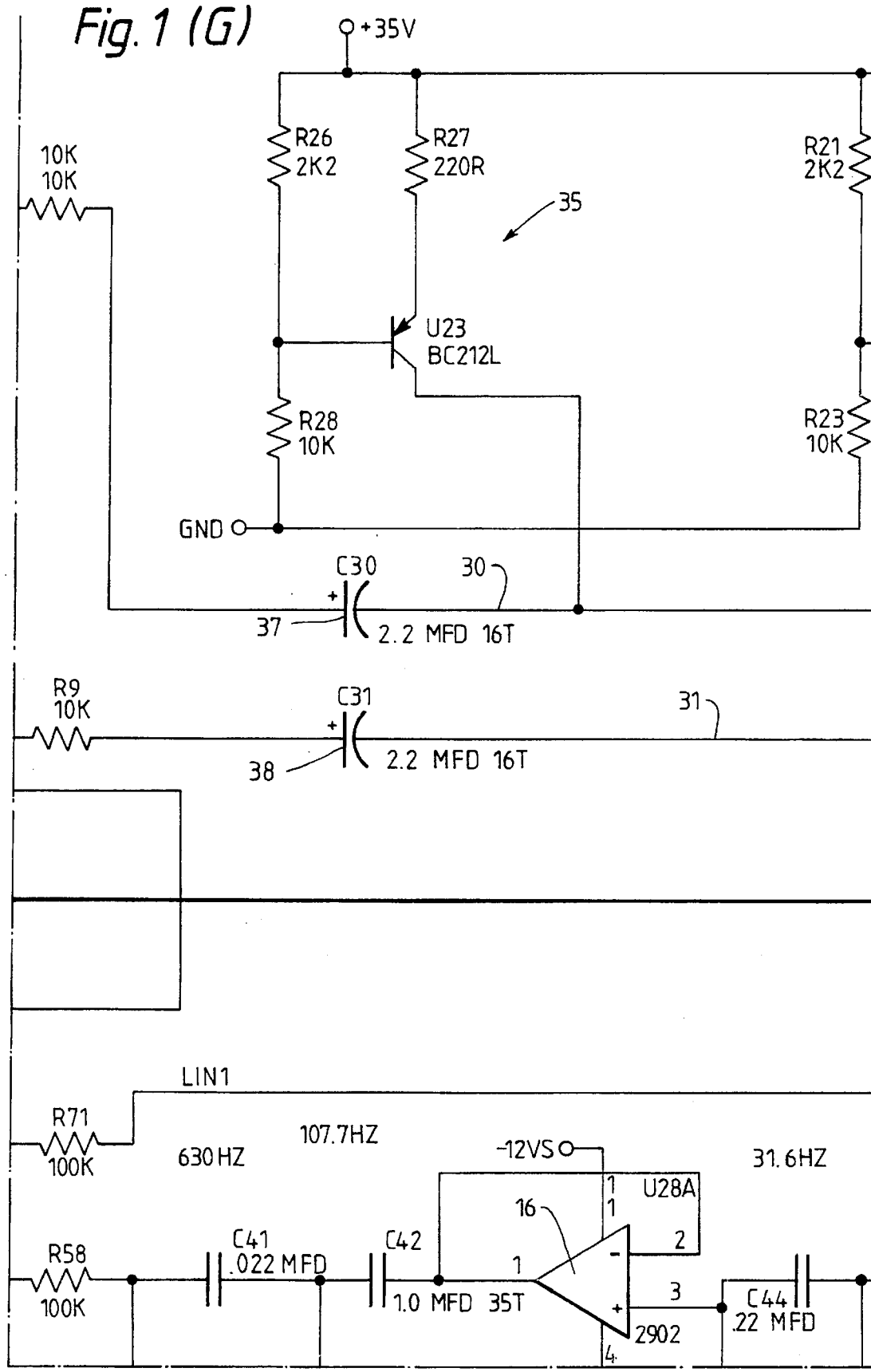
Figure 1H:
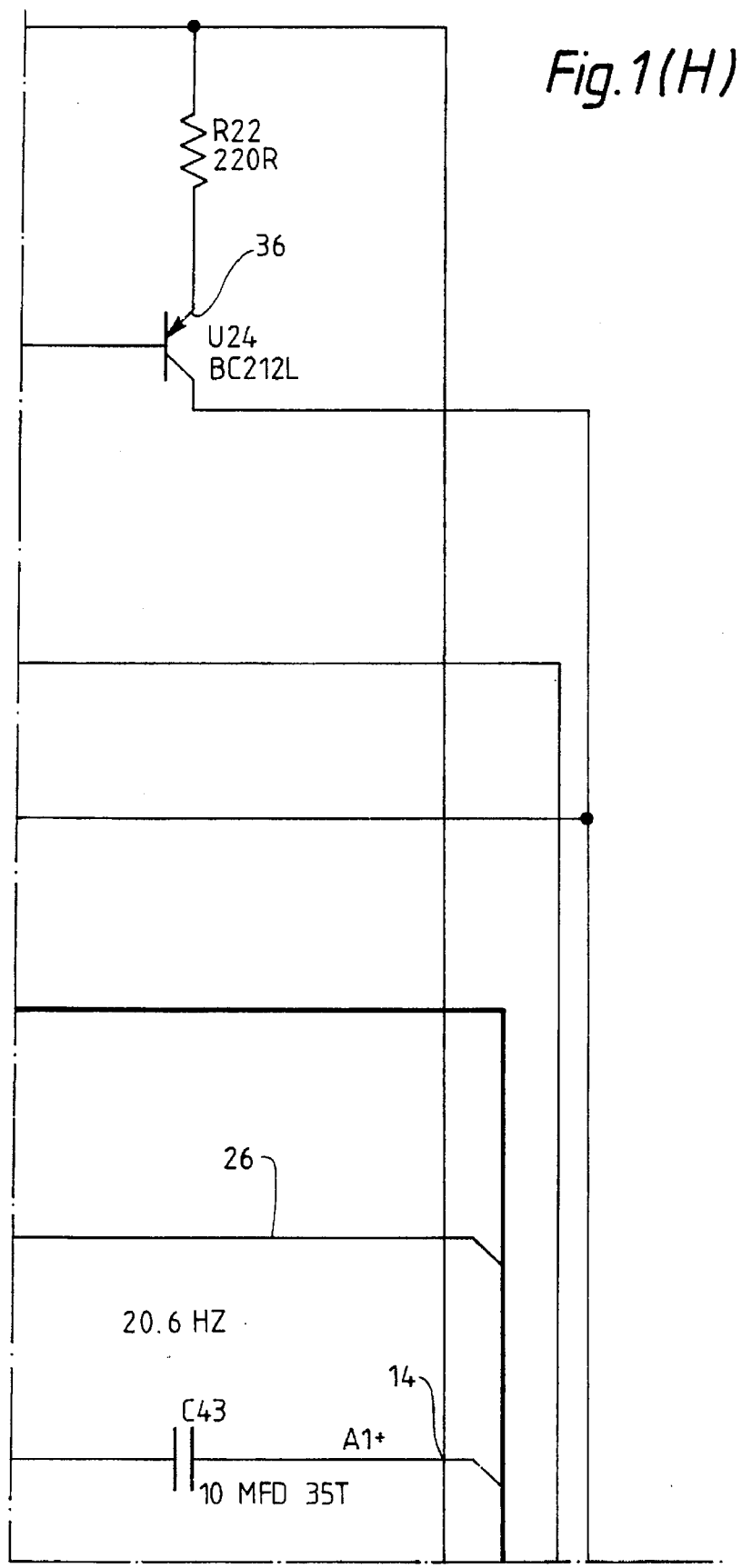
Figure 1I:
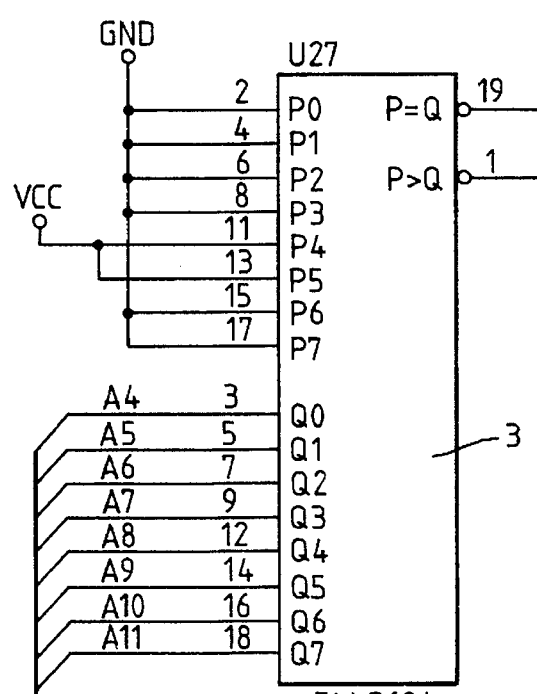
Figure 1J:
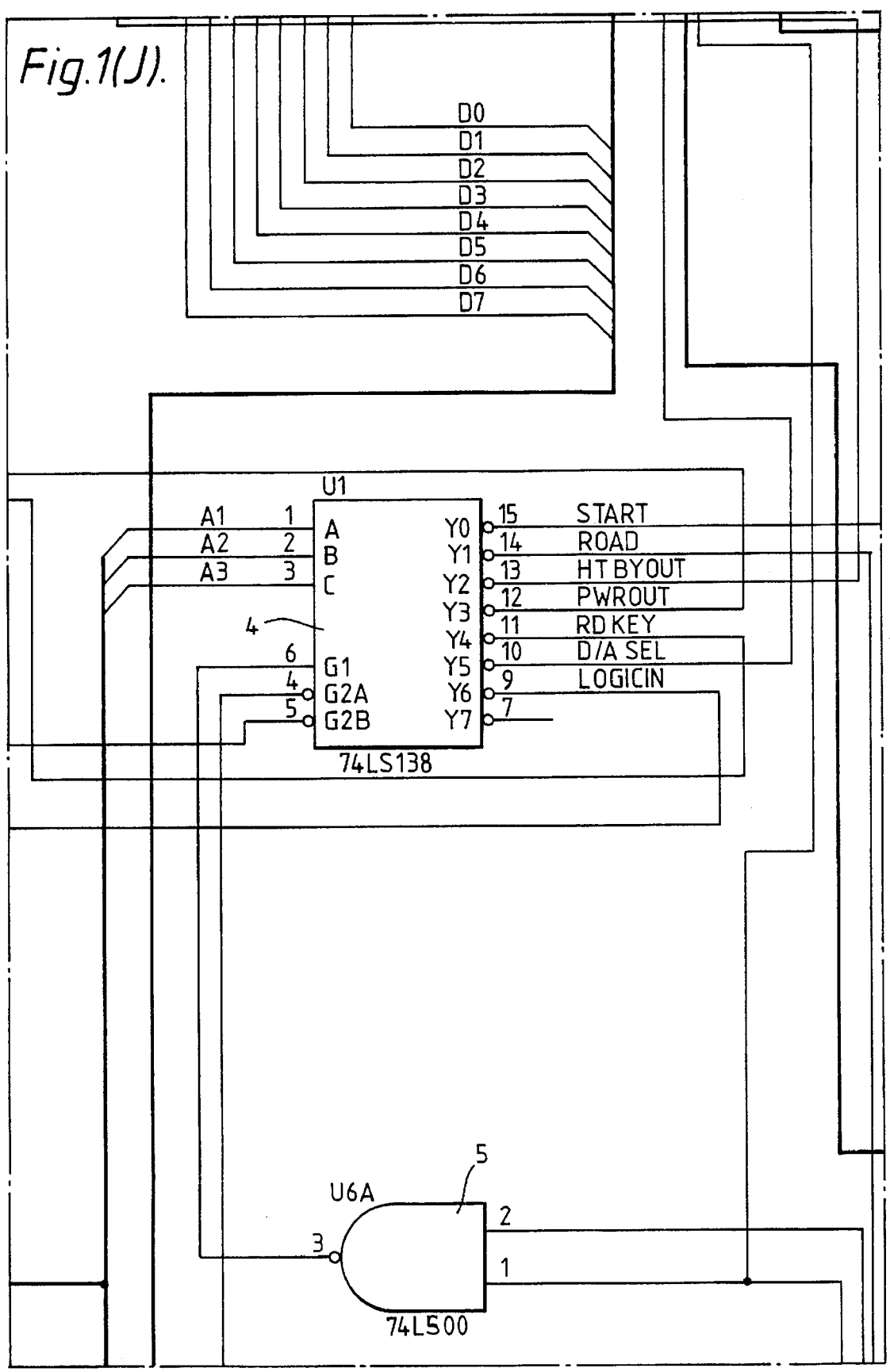
Figure 1K:
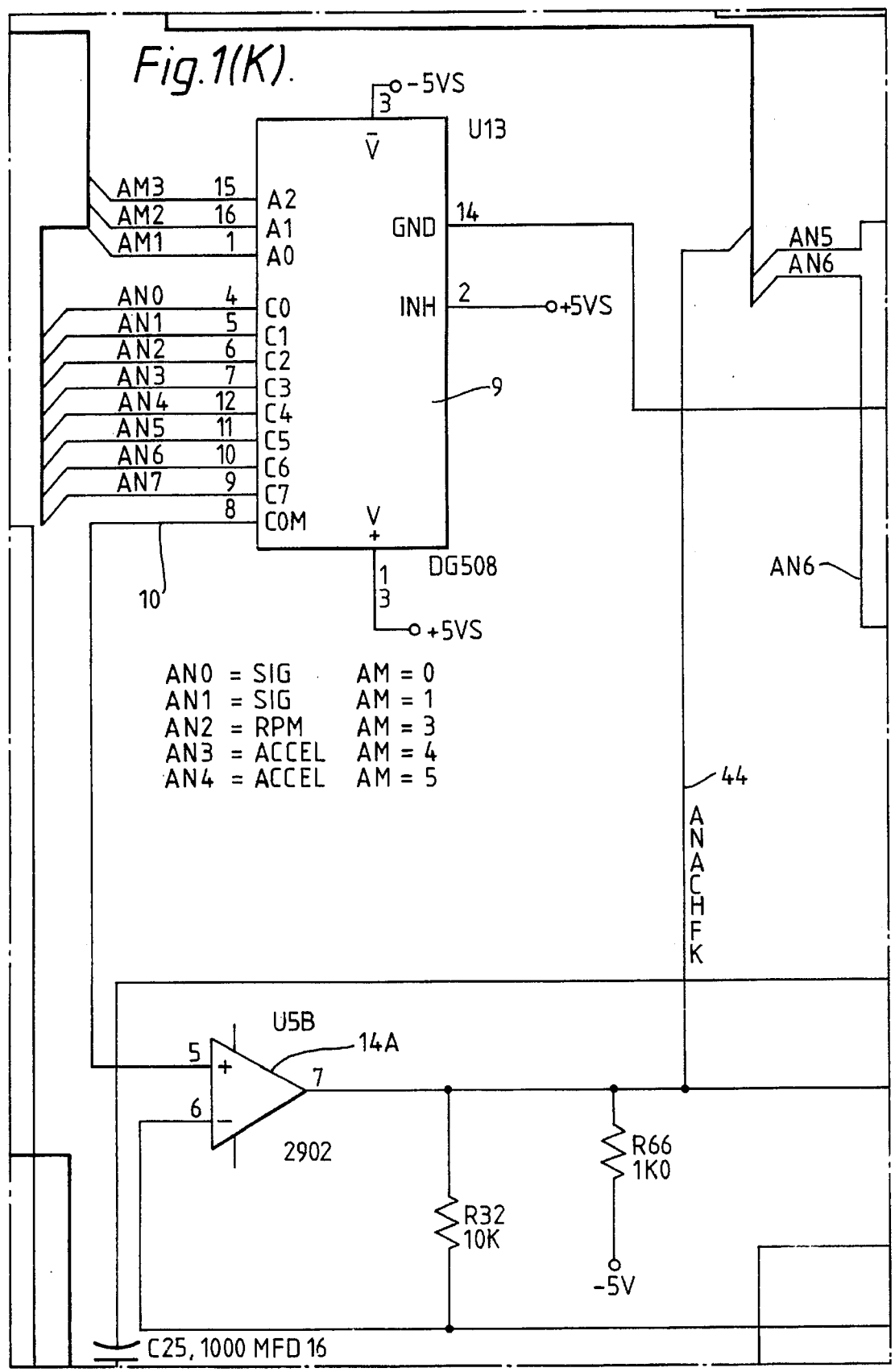
Figure 1L:
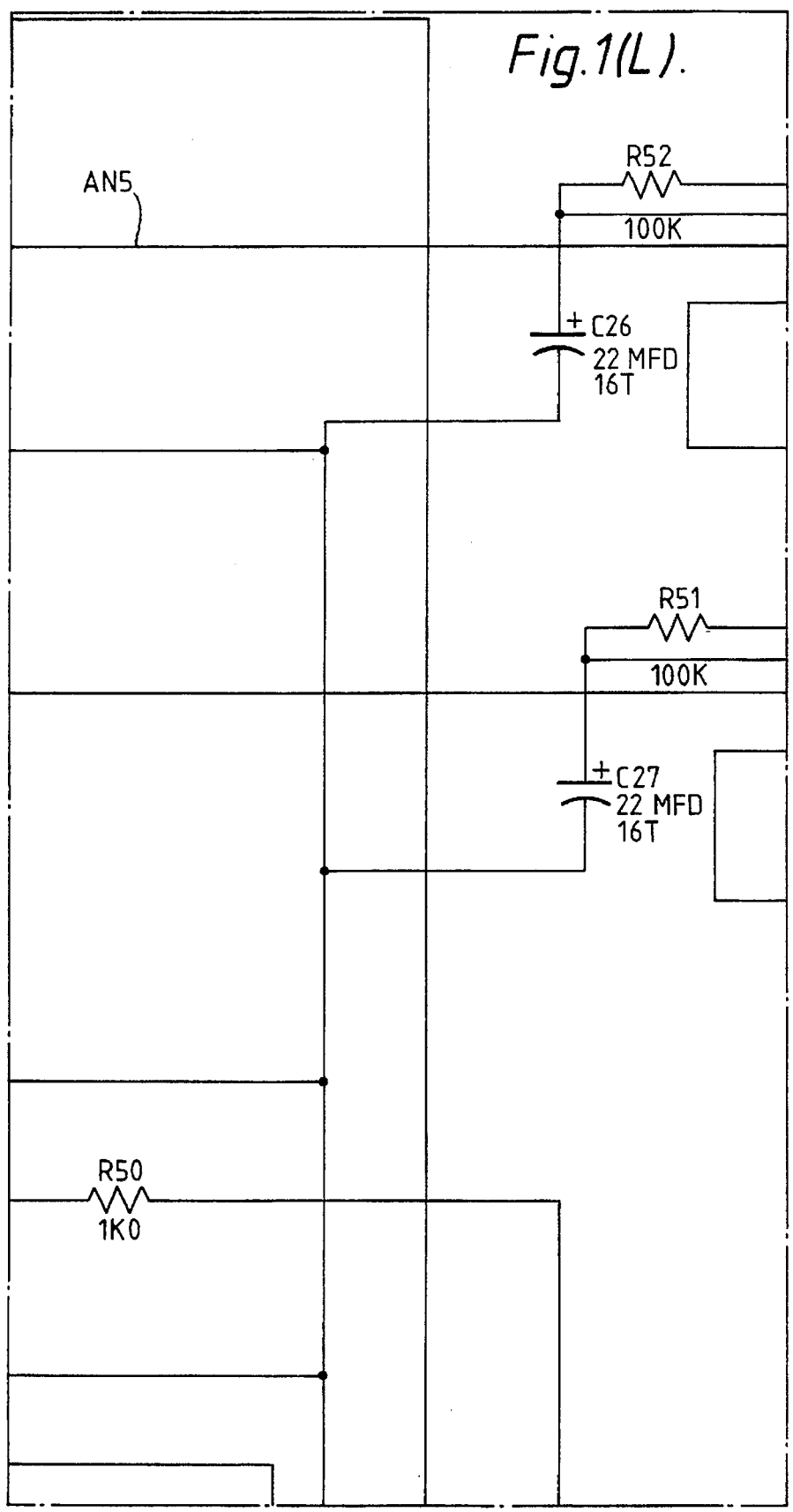
Figure 1N:
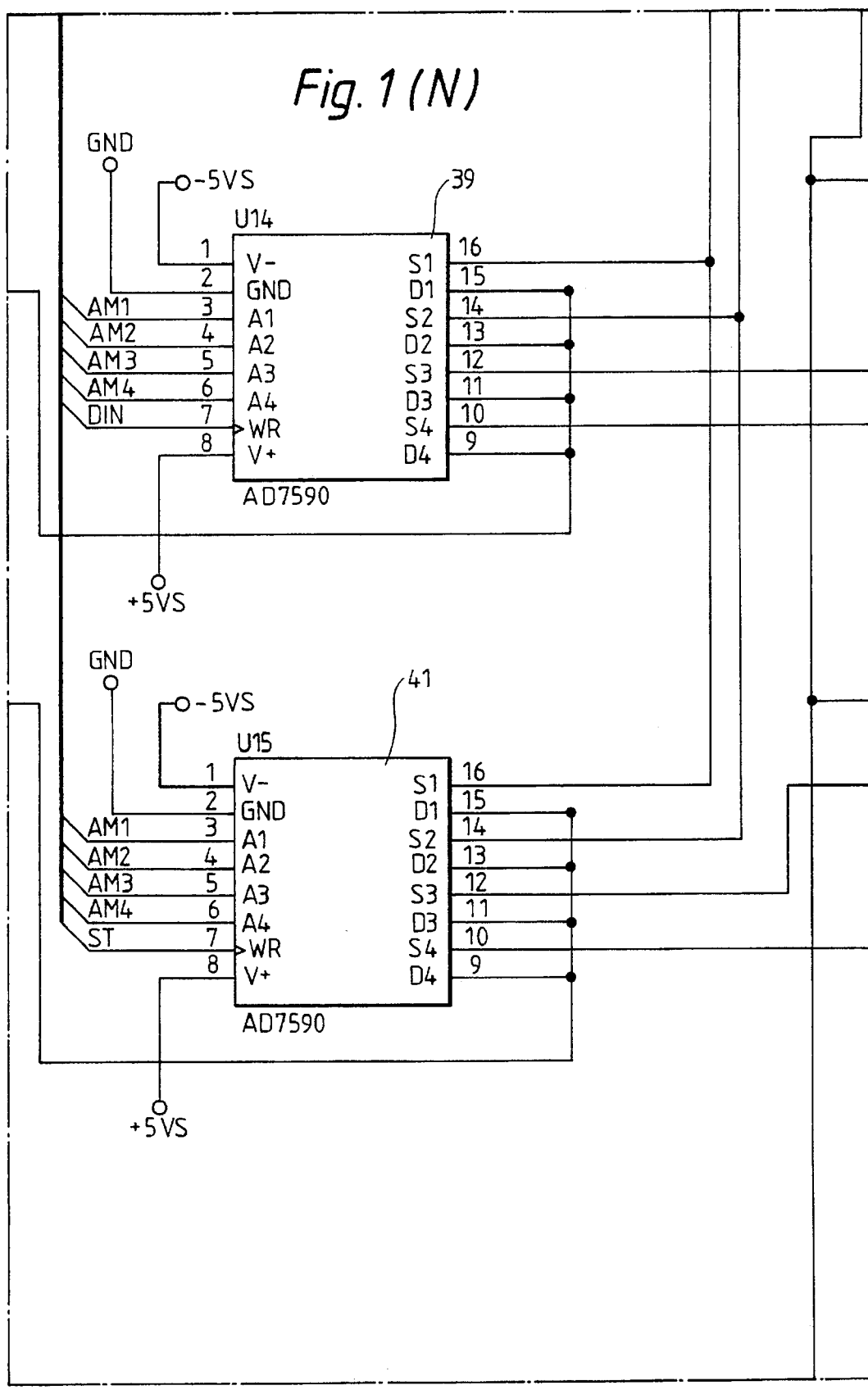
Figure 1O:
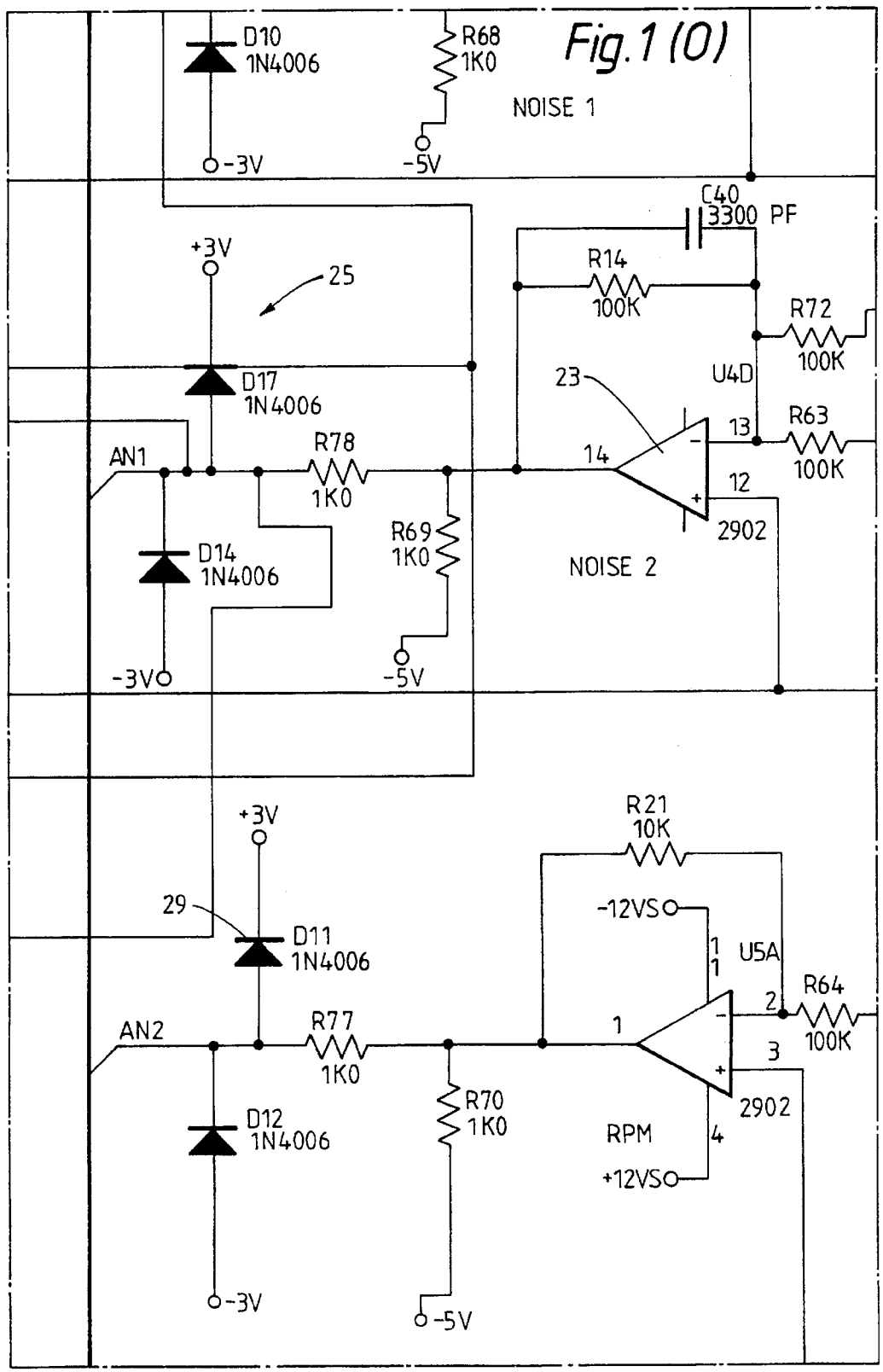
Figure 1P:
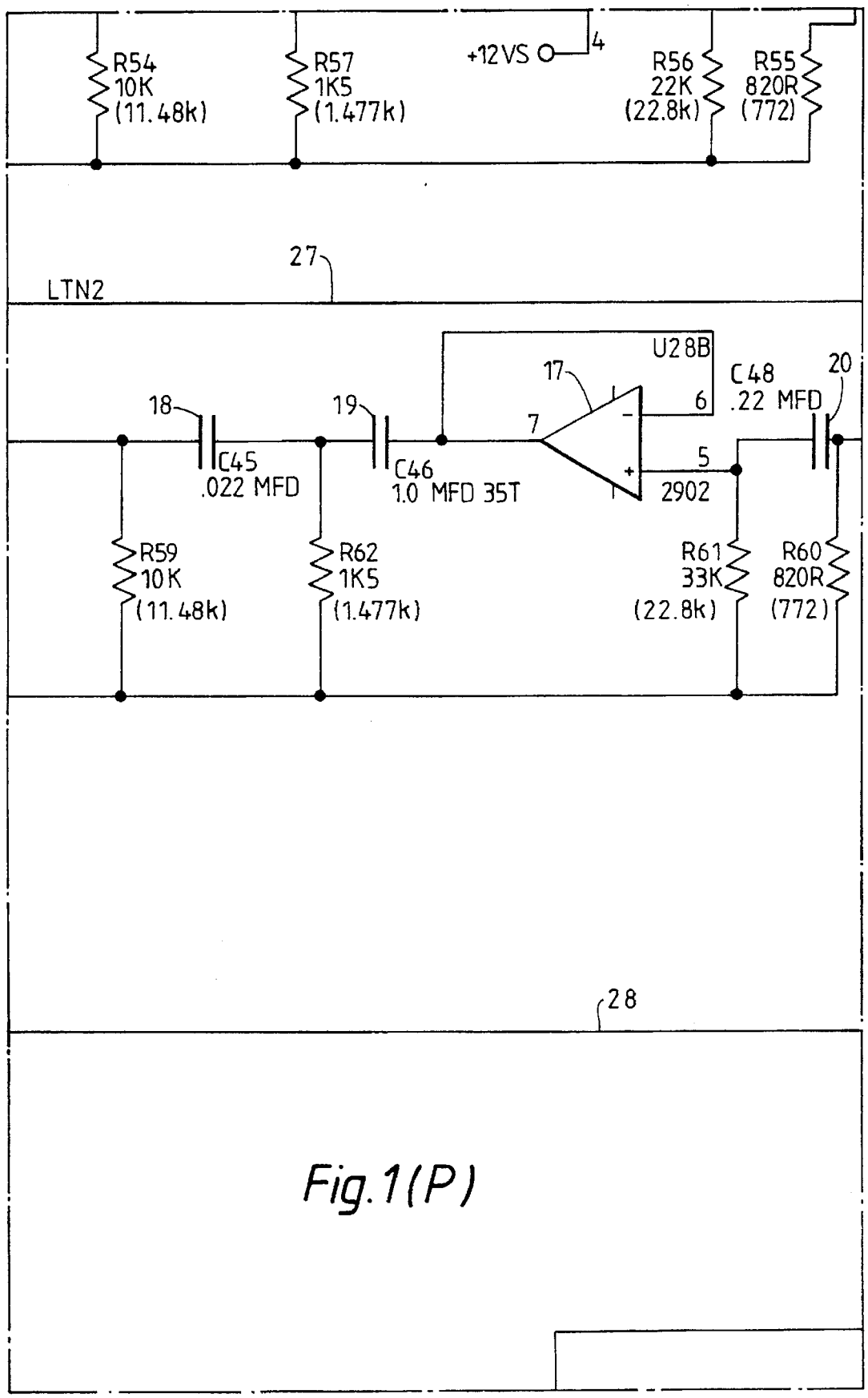
Figure 1Q:
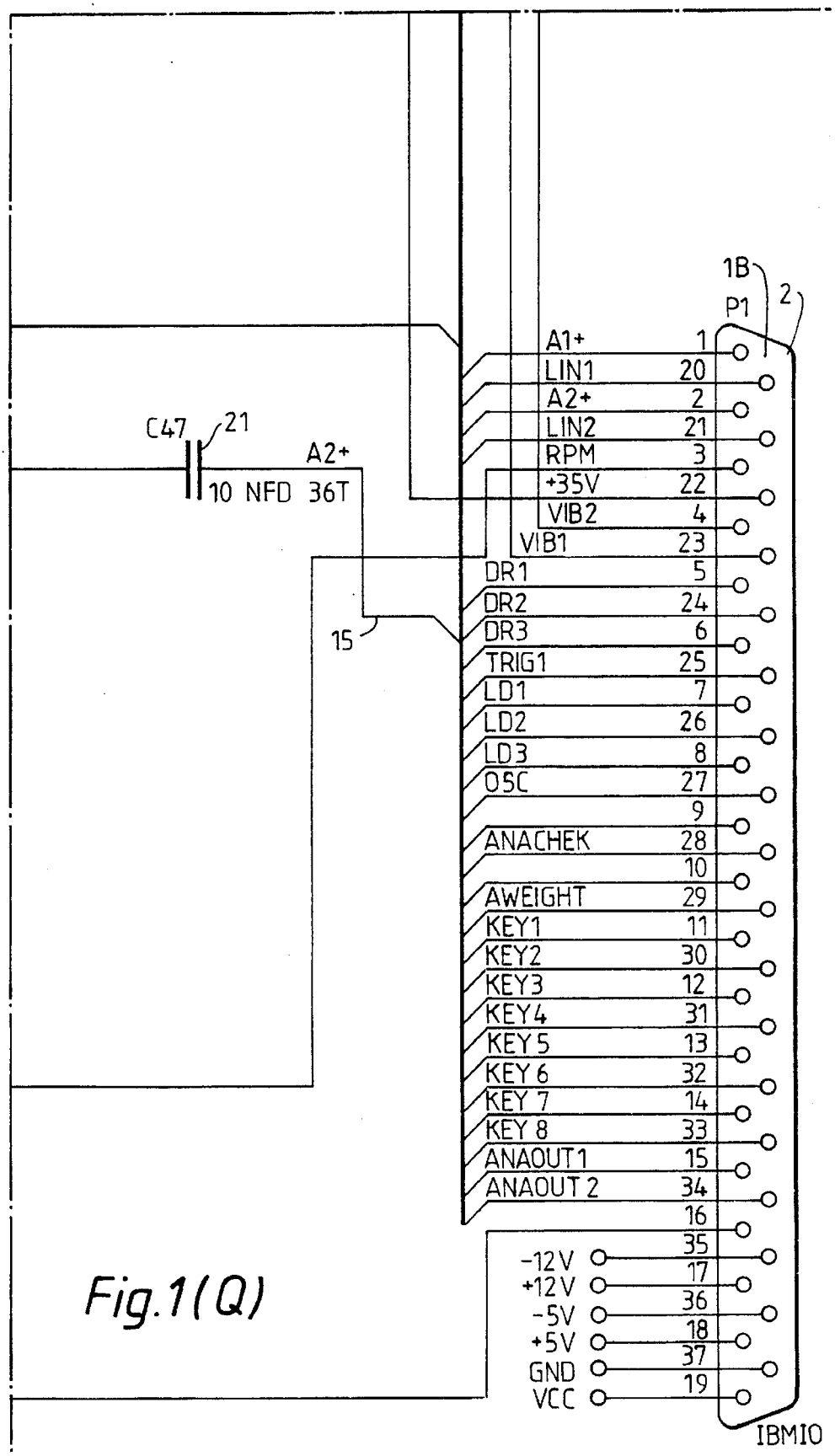
Figure 1S:
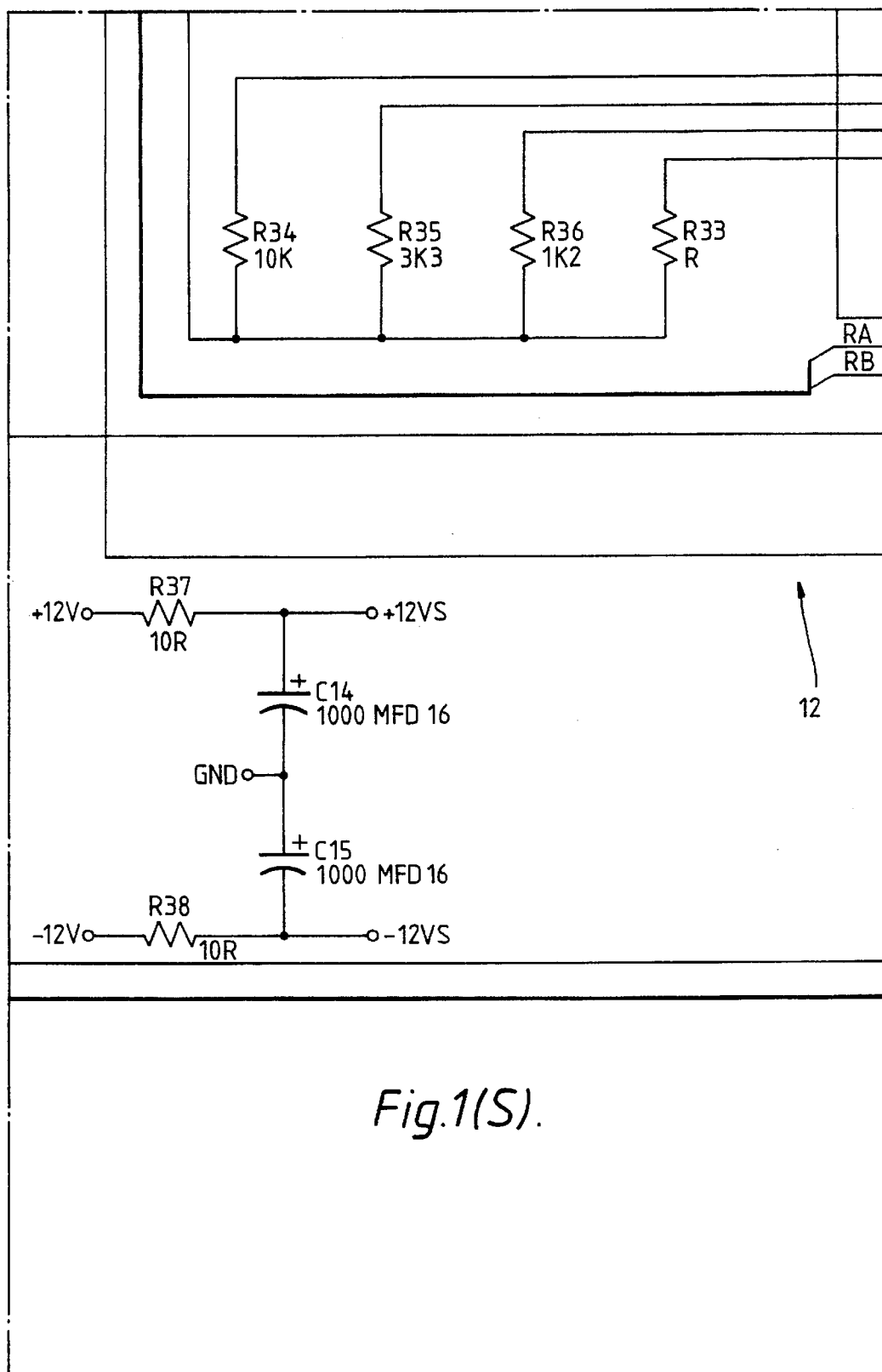
Figure 1T:
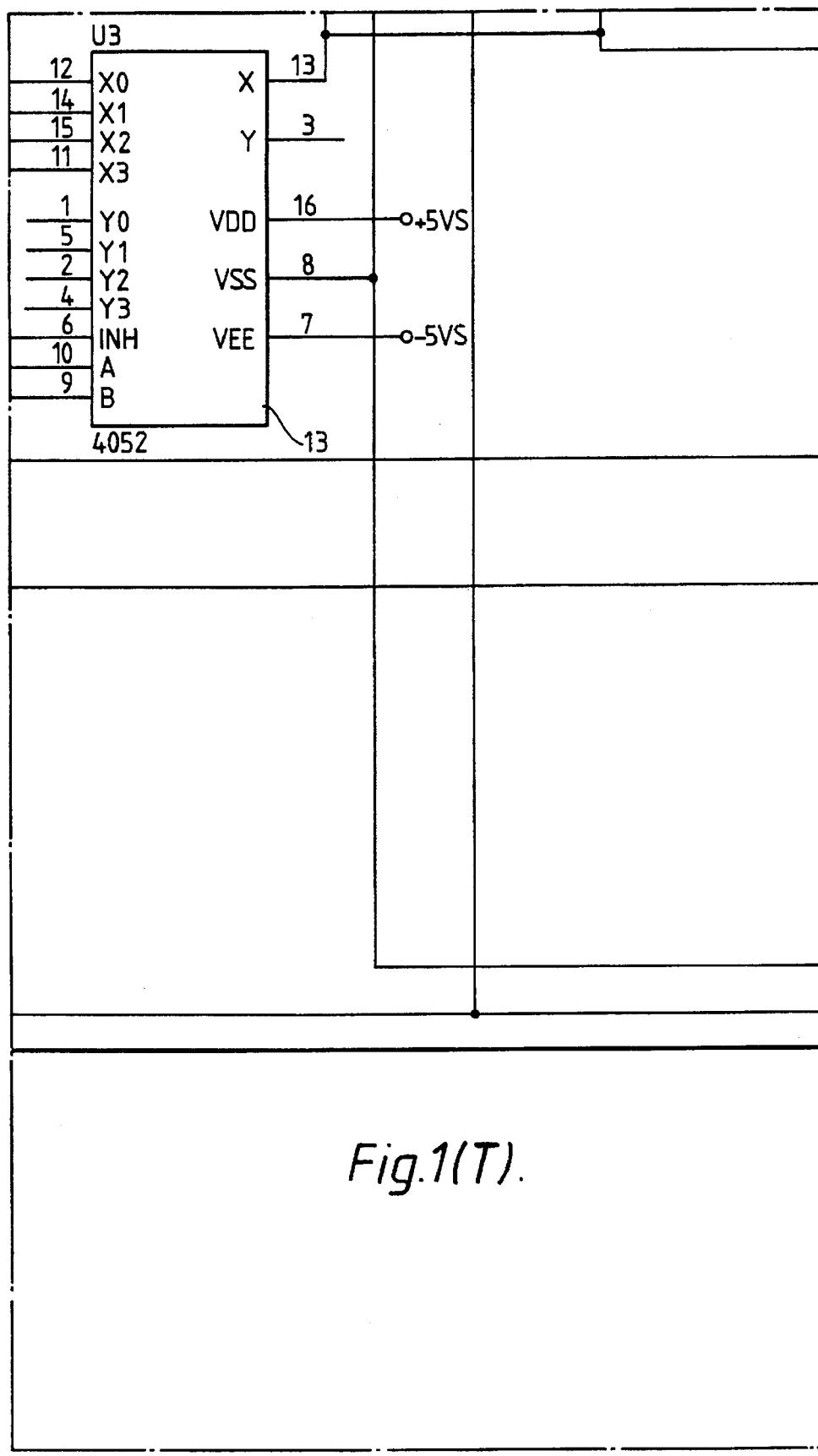
Figure 1U:
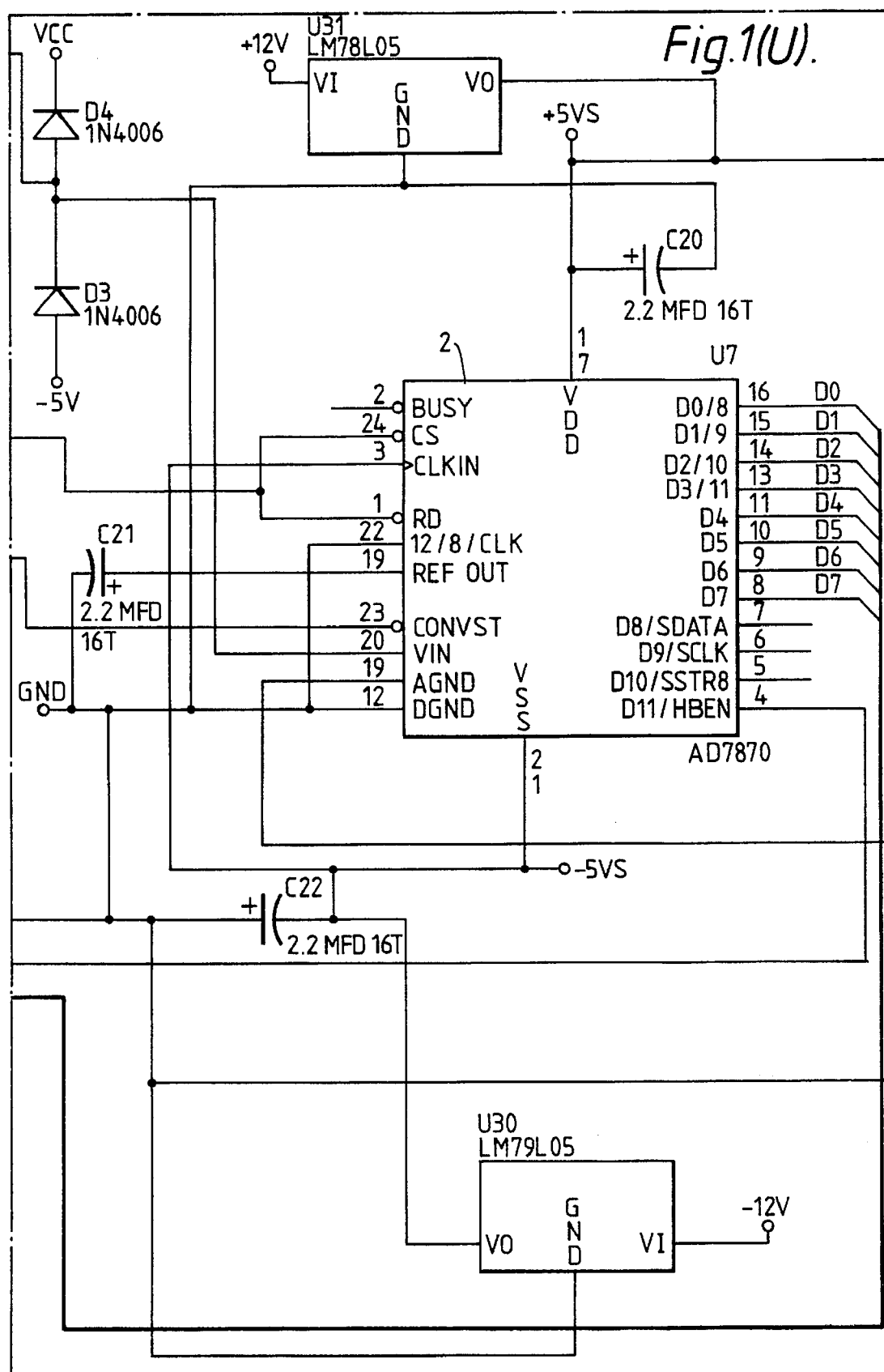
Figure 1V:
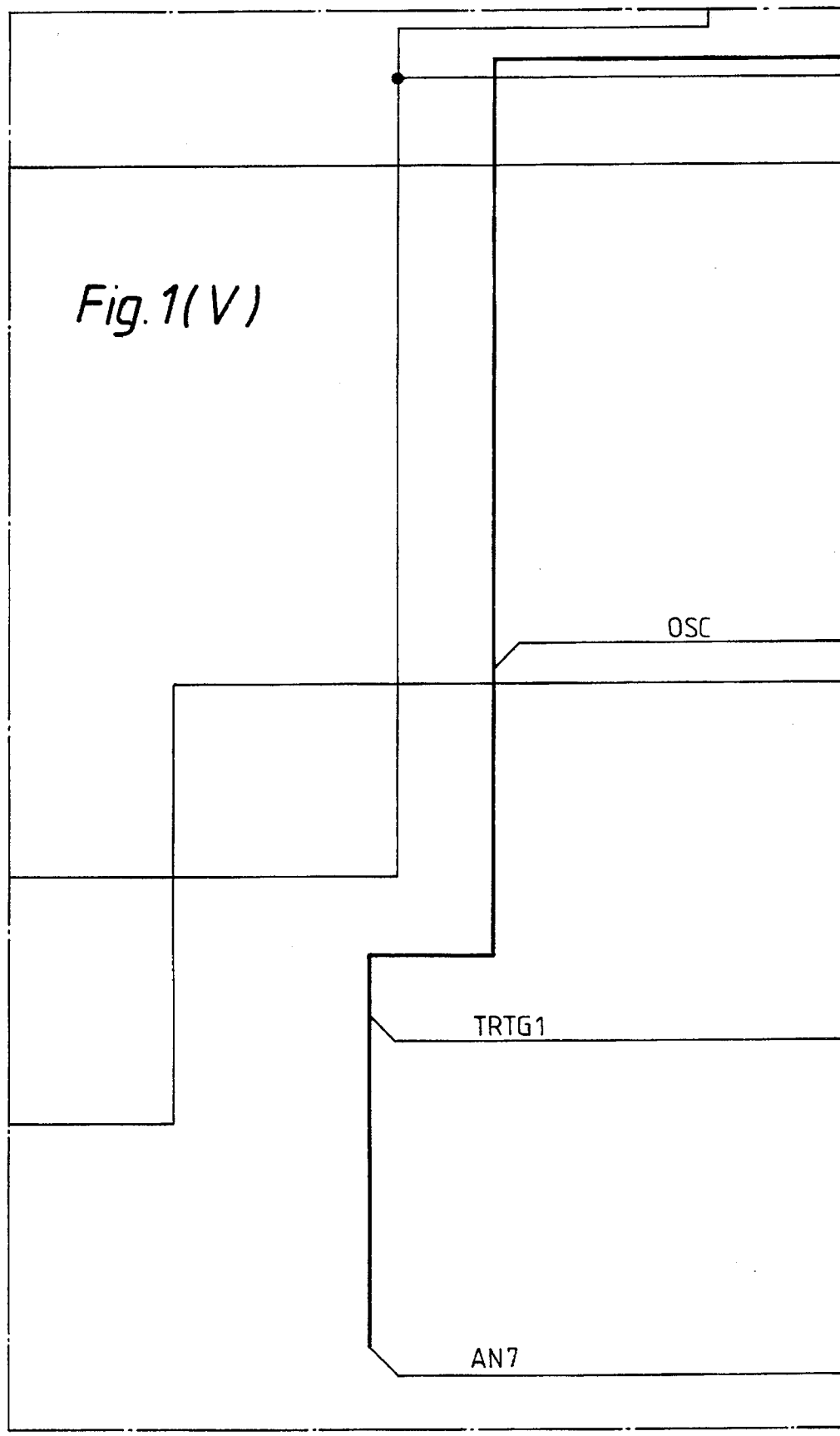
Figure 1:
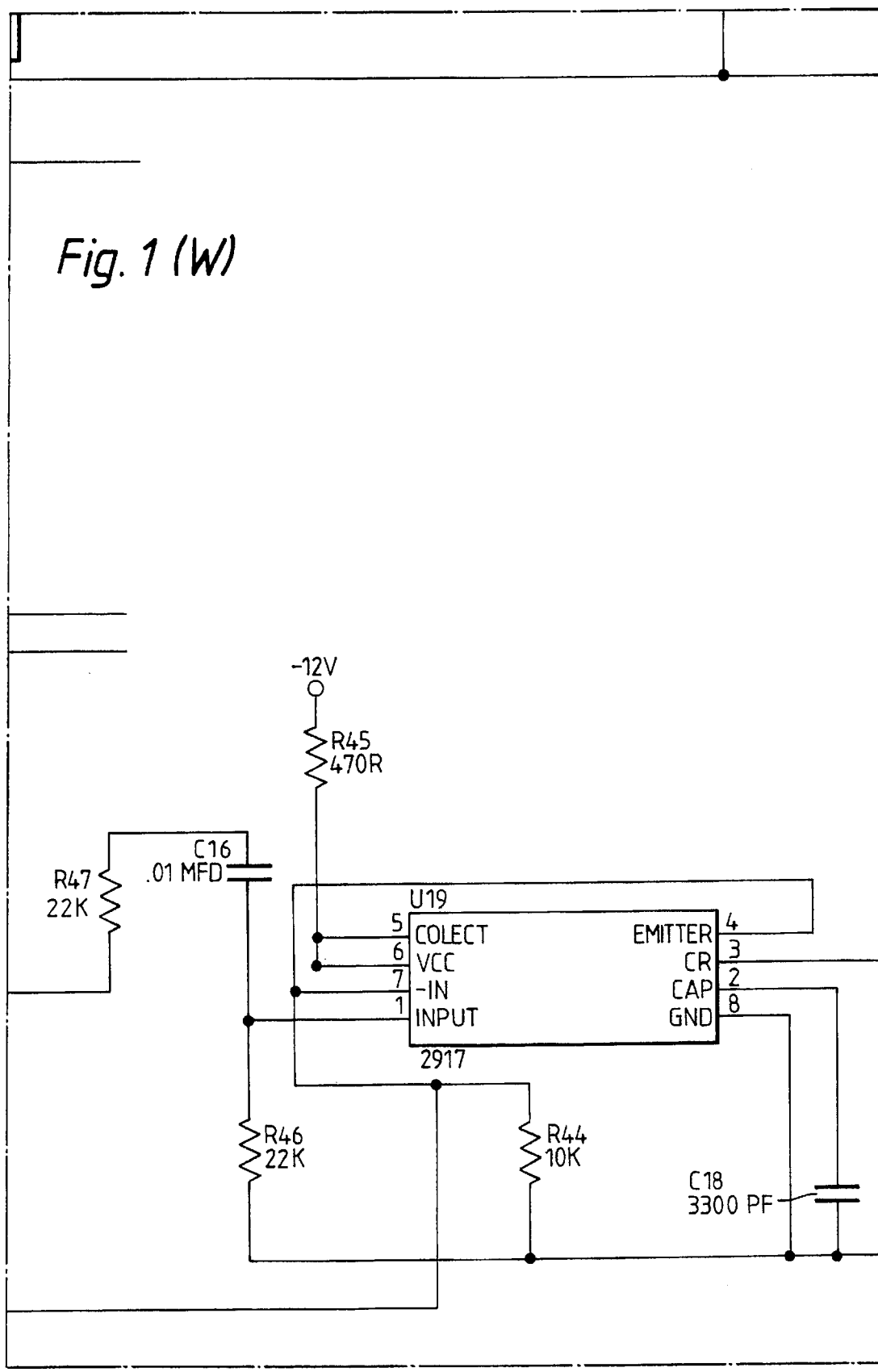
Figure 1X:
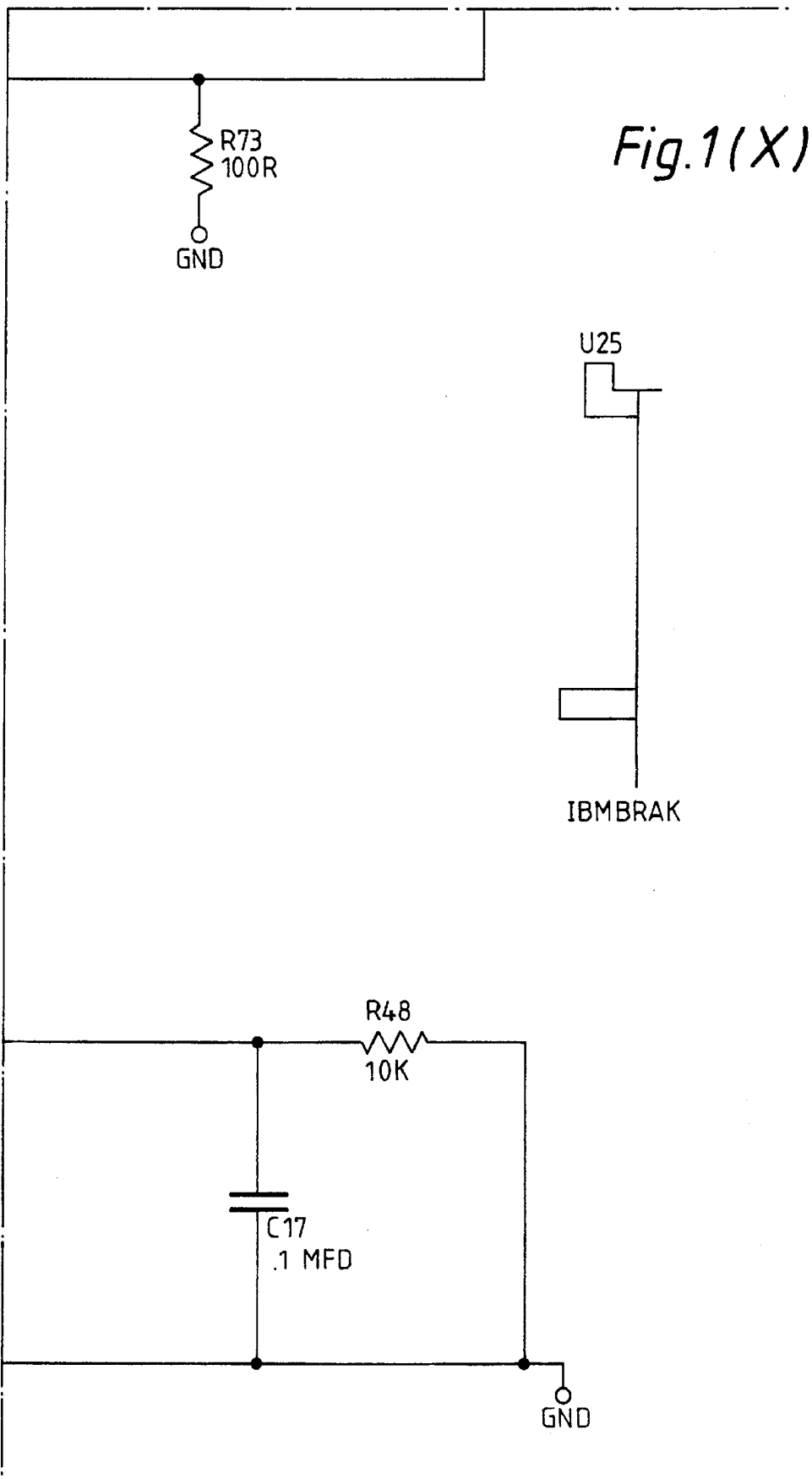
Figure 1Y:
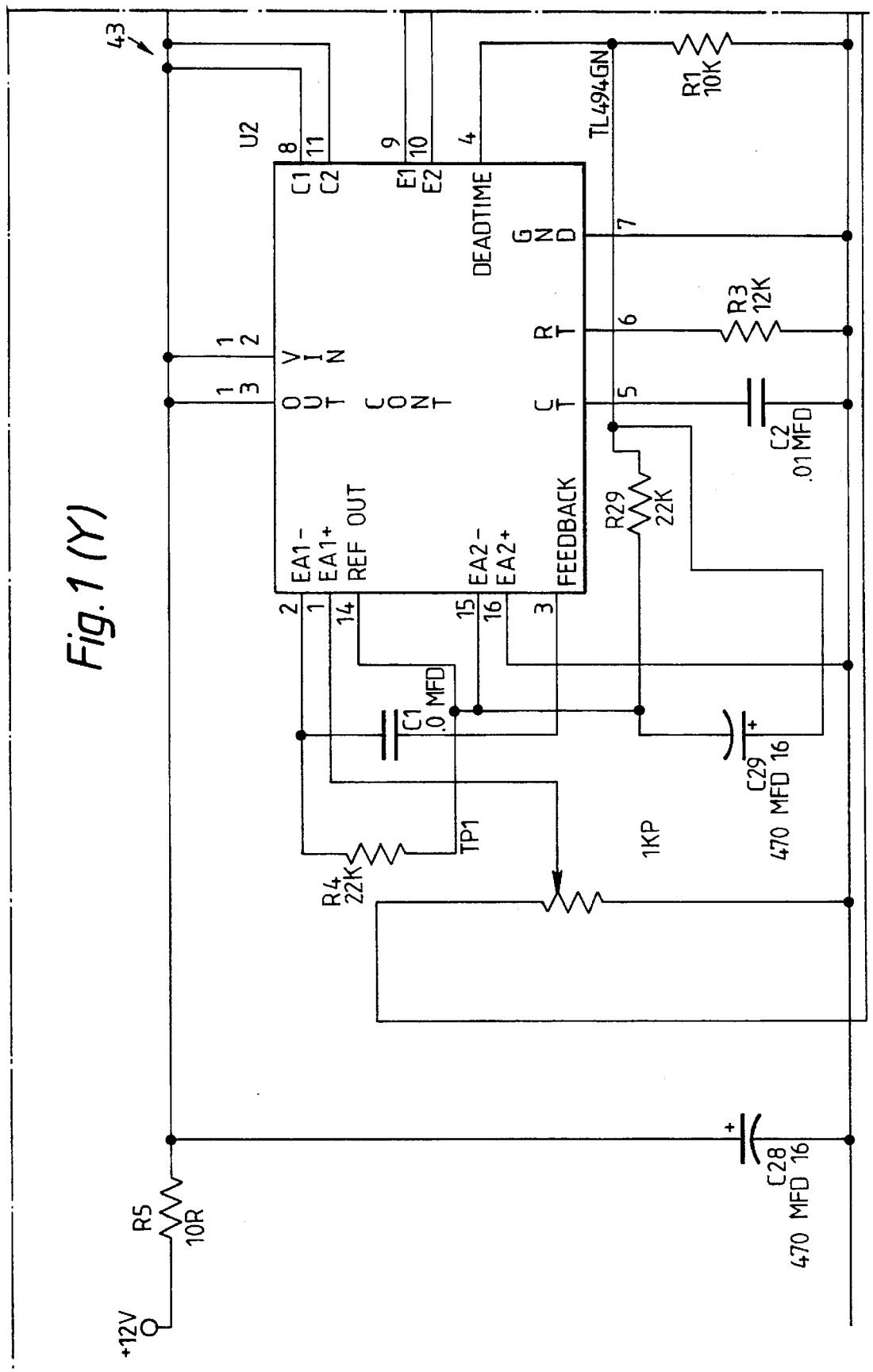
Figure 1Z:
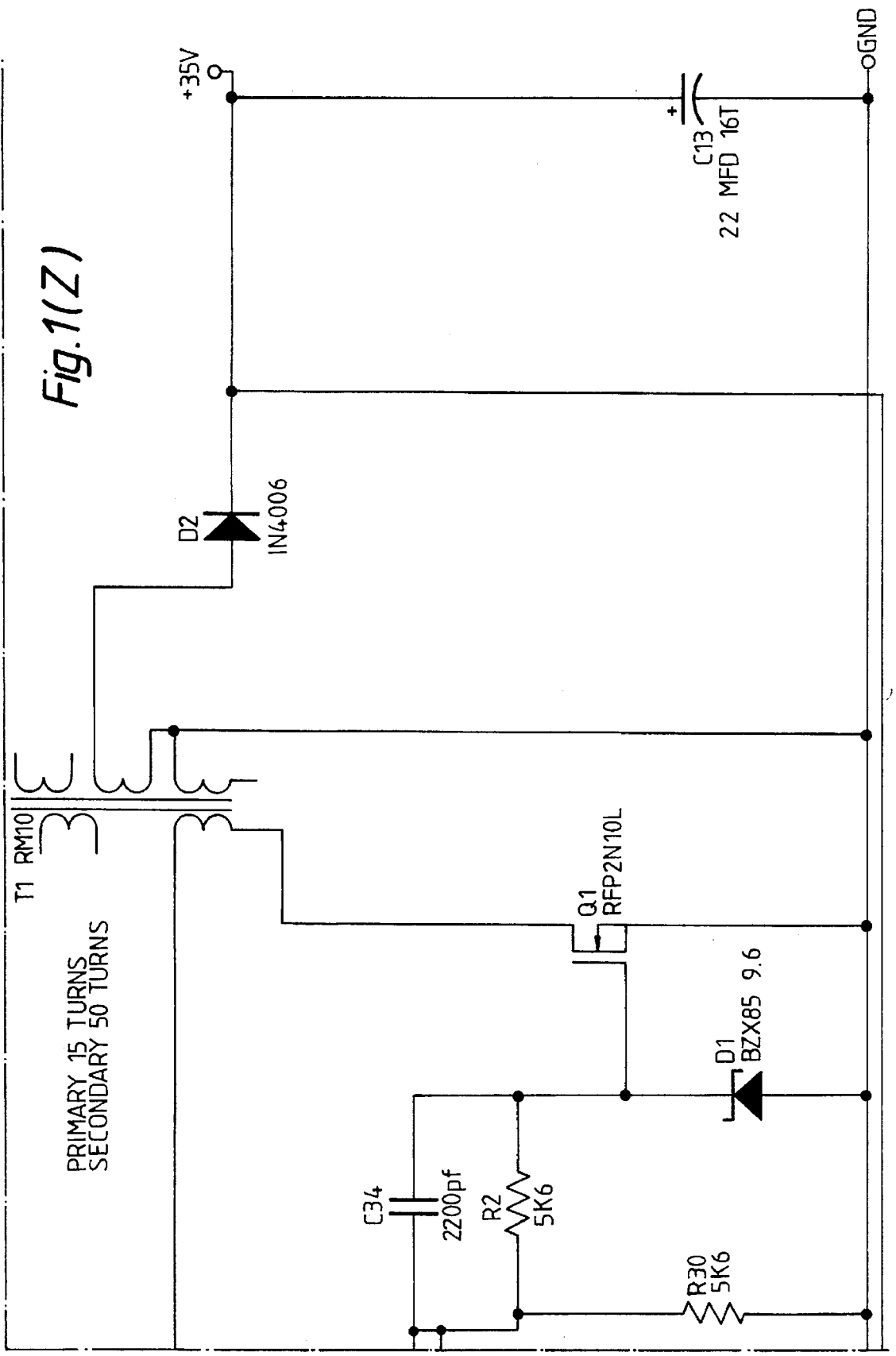

Referring to FIGS. 1(A)–1(Z), the present circuit includes a first bi-directional multi-path plug-socket connector 1A having twenty input paths, A0–A19, for binary words representing numerous address signals cycled at random intervals by a PC host (not shown). The components schematically shown in FIG. 1 are preferably mounted on a single circuit board mountable in an expansion slot or elsewhere within the housing of the host PC. Connector 1A feeds the aforementioned address signals to the circuit board, along with some direct voltage levels on conductors B1 to B9 and control pulses on conductors labelled B11–B14 and A11. The address signals themselves are referenced A0–A19, whereas the terminals of connector 1A on which they appear are labelled A31–A12 (not to be confused with the address signal references).

On conductors A1–A9 of connector 1, an 8-bit digital word is read out into the computer from the circuit board. The bits are referenced D0–D7, and at any instant represent a single amplitude, but which in successive instants represent the possible levels of different signals which thus time-share the eight lines A1–A9. The eight-bit signals D0–D7 thereon are derived from an analog to digital converter 2 described more fully below. A control signal AEN also received from the computer on A11 enables measurements to begin or continue, in that the computer microprocessor states the address bus to be adequately stable and/or validated.

Of the computer generated address signals A0–A19, eight of them, A4–A11, are compared in a comparator 3 with fixed voltages $V_{cc}$ and ground, such that only HEX numbers between 300 and 400 in the A0–A19 address enable instruments and machines to be powered and read at appropriate instants. HEX numbers between 300 and 400 are AND-ed in a decoder 4 with signals including the A1–A3 address signals, in order to generate start signals to the aforementioned devices. If desired, the base address can be made selectable instead of necessarily A0.

This start signal enables the successive digital words D0–D7 appearing on terminals 8–11 and 13–16 to be appropriately identified. The aforementioned A1–A3 address bits from connector 1 are also AND-ed with read or write bits received from the computer on terminals B13, B14 of connector 1A, via a NOR-gate 5. Thus one of the HEX numbers between 300 and 400 is chosen by the comparator 3 as the start for A/D converter 2, which chosen number can be varied.

The D0–D7 output signals from converter 2 time-share the A1–A8 terminals of connector 1A with input trigger signals, also referenced D0–D7, which initiate multiplexing signals referenced as shown from respective chips which are latches 7 and 8. These latches act generally similarly, to take a clock signal from a terminal Y3 of decoder chip 4, and remember the D0–D7 word or value received from the computer at the instants that the Y3 clock signal is present, to sustain the multiplexing and other control signals generated by them until clocked again. Preferably in this embodiment the computer by this means sets the output of latch chip 7 to the binary value written to that address designated by 306 HEX. Arrangement other than this specific example will readily occur to the skilled person.

Eight analog signals AN0–AN7 are initiated by the external test instruments and processed to provide eight inputs to be measured, which are fed to a multiplexer 9. There is a need to plot all these signals, preferred origins of which will be described later. Some of these signals represent noise levels requiring plotting against others of the analog signals AN0–AN7 and/or other parameters such as torque or gear ratios. As will be described later, the multiplexer can alternately be chosen to deal with 16 inputs, especially as there are the further necessary software channels readily available. Usually only engine speed will be plotted or displayed on the abscissa, because new plots will be made for different gears or torques. More specifically, microphone and/or accelerometer signals, or rms derivations therefrom, are plotted against speed in a specially advantageous embodiment.

In order for the analog-to-digital converter 2 to operate on the eight analog signals AN0–AN7 one at a time, all in known sequence or only one may be required for the time being, for sustained readings or for a series of measurements, the converter contains sample and hold means and the aforementioned start signal from terminal YO of gate 4, and certain gating binary signals AM1–AM3 release the eight analog signals one at a time in turn on a combining output line 10 of the multiplexer chip 9. The AM1–AM3 signals and a fourth, AM4, are also used to select the analog noise signals one at a time for rms determinations, as will become clear hereafter.

One of the eight output analog signals on line 10 is fed via a variable gain amplifier 12 which can be switched to various values of gain, enabling the output to lie between limits, but the amplification factor can be allowed for in processing the final number in the computer. This is routine for comparing an unknown signal with a standard signal of different amplitude, and hence measuring the former. In fact the variable signal from an operational amplifier 14A in amplifier 12 is differenced with the actual analog signal each instant appearing on line 10, in amplifier 14A, and fed to a $V_{in}$ terminal of the converter 2. The converted analog signals are fed to the computer on lines D0–D7 as aforesaid. The OP-amp 14A must have high enough output at low enough impedance at the converter input. The shown amplifier U5B may be replaced accordingly by the more powerful, lower output impedance U33 amplifier.

It will now be described how the various analog signals are derived in a preferred embodiment which scans gearbox noise such as resonances or white noise, across a range of rpms, torques or locations on or within the machine, either as an aid to design, or as a rapid production test of some or all samples. The invention is not limited to this source of analog input signals such as AN0–AN7, but is admirably appropriate to performing Fourier analyses on these.

In a preferred embodiment, the origins of the eight analog signals AN0–AN7 are:

| | |
|---|---|
| AN0 | first microphone |
| AN1 | second microphone |
| AN2 | dc tachometer reading |
| AN3 | first accelerometer |
| AN4 | second accelerometer |
| AN5 | rms dc determination of AN0, AN1, AN3 or AN4 |
| AN6 | rms dc determination of AN0, AN1, AN3 or AN4 |
| AN7 | tachometer triggered delivers dc |

The outputs of each of AN5 and AN6 represents at one time only one selected signal of the four, and is sustained as an rms signal at that level until the next DIN pulse is latched from chip 7. When this DIN signal arrives at multiplexers 39 or 41 one of the four is selected and sustained without change to enable an rms determination; this is further described below. A degree of flexibility is provided by the above, in that a second accelerometer or vibration meter, and/or a second microphone may not always be needed, measurements at one position sometimes being sufficient. Also only one tachometer (ac, pulse, or dc reading) will generally be adequate.

The two ac microphone signals are inputted at 14,15 from a second connector 1B dedicated to (a) couple out energization signals or voltages generated on the board, or fed via the board from the host computer, and directed out off-board to energize instruments or to control the machinery to be tested; and (b) to receive as inputs the instrument sensing signals, such as the microphone acoustic sensings. The signals 14 and 15 are amplified in separate identical channels by amplifiers 16,17 tuned by filter components such as capacitors 18,19,20,21 and associated resistors, to give respective response curves to amplifiers 16,17, preferably particularly resembling that of the human ear. The outputs of these selective amplifiers 16,17 are then inputted to respective linear amplifiers 22,23, which deliver the ac outputs AN0, AN1 limited to ±3 volts by diode pairs 24,25. In general, the two or more microphone sensings will be subjected to identical filtering. Alternatively, outputs of several different microphones can be summed in resistance networks, according to required weighting between them, before being evaluated for noise significance.

For some of the signals, the response shaping stages 16–21 may be omitted, or by-passed as shown by inputs 26,27 direct from further appropriate input conductors of connector 1B and applied directly to the linear amplifiers 22,23. However, the presently preferred embodiment is intended to give responses according to their noise nuisance value, not to absolute signal levels which will only be objectionable when occurring at or passing through certain sensitive frequencies.

A dc input 28 from a tachometer is amplified by a 2902 chip, limited to having a ±3 volts input range by diode pair 29, and delivered as output AN2. Two accelerometers deliver inputs 30,31 which as approximately 10 mV ac signals arrive at amplifiers 32,33, whence they are limited if necessary by diode pairs 34 to around 3 volts ac, they exist as outputs AN3,AN4.

The accelerometers in this preferred embodiment require respective constant current sources 35,36 derived from 35 volts dc typically not available from the PC host and preferably provided externally of the board. The constant currents are fed out via connector 1B on the same lines 30,31 on which the accelerometer ac signal inputs are received from the instruments. The accelerometer outputs are not subjected to audio filtering or tuning as are the microphones, in order to give a shaped response curve, such as other than high pass or band pass. The inputs are decoupled from the dc supplies by adequately large capacitors 37,38 to handle the low input frequencies.

The ac signals AN3,AN4 from the accelerometers and the ac signals AN0,AN1 from the microphones are fed to separate original inputs S1–S4 in a multiplexer chip 39 where they are multiplexed and sustained at a fixed level long enough to enable an rms sampling determination using the same control signals from latch 7 that control multiplexer 9. One of the four analog signals then is selected to pass between its own S to D path of chip 39, which level is only updated periodically. The four multiplexing control signals AM1–AM4 from latch unit 7 open only one of the S to D paths of multiplexer 39 or 41 at a time, and then only if a DIN pulse is also present thereon at the same instant. The selected S to D path is coupled to another stage 40 which delivers rms versions of the selected one of the four analog signals AN0, AN1, AN3, AN4 for a sustained period which has been designated long enough for delivering a reliable rms value at an output AN5. Identical circuitry 41,42 produces the same multiplexed selected, and held or sustained one of the four rms signals at a second analog output AN6, generally at different instants since the ST pulse from latch 7 and not the DIN pulse triggers identical multiplexer 41. The second multiplexing thereby, and the output AN6 may both be provided for fail-safe redundancy or for facilitating separate analyses. The rms chips 40 and 42 are preferably AD636s with appropriate external impedances connected thereto. A third multiplexer may be required, if there are 16 noise channels, as described later.

It is noted that multiplexers 39–42 constitute an analog rms measurement system and the noise filters are the analog type. Major transients can be missed by digitizing too coarsely, so analog is preferred. It is easy to measure digitally over a few thousandths of a second, but not over seconds. The typical operation involves 12,000 samples per second, to produce a 6 kHz Fourier analysis.

The analog signals AN0–AN7 thus are selected one at a time by the word applied to control multiplexer 9, and the resulting signals in turn are quantized in converter 2 for analysis by the PC host, and for graphing if desired. The input analog signals to the converter can be led via an ANACHECK line 44 to connector 1B and hence to be observed by off-board oscilloscope means (not shown).

In an alternate embodiment, there may be sixteen analog inputs, AN0–AN15, and there then need to be four AM inputs in the word fed to a device multiplexer 9 to select any one of the 16 addresses (for 16 noise channels) digitally. With 16 lines, we can have various different torque channels. This embodiment has one more dc rpm channel and one less ac rpm channel. The dc generator was taken externally, off-board. Within this available space, a third microphone and filter channel is preferably incorporated for added flexibility. Also one noise measurement is preferably taken on the outputs of all three noise sources added together in analog manner in a resistance network as referred to above.

Two swept signals for the variable drive to the machine to be tested may be generated from the 35 volt supply from unit 43 by appropriate control of the control words fed from the latches and the computer, to a digital to analog converter 47, to provide up to 20 volts on output lines 48,49 separate dc drives for supplying components of an off-board test rig. Converter 47 may be controlled by a word comprising eight bits D0–D7 from an off-board microprocessor, and four bits D8–D11 from latch 8, to give a varying output analog voltage. In another embodiment, 10 volts dc supply was adequate. The supply of 35 volts is usually more conveniently auxiliary, not on the board.

As a practical measure, the microphone outputs of all four alternative meshings of one transmission can be continuously measured and automatically plotted on four adjacent graphs as shown in FIG. 2. Graph A represents the meshing of the left hand gear pair shown schematically at 50 over 1000 to 2000 rpm. Similarly other meshings in the same gear train are shown in Graphs B,C and D. These graphs can be produced to show the fundamental mesh components and the harmonics thereof.

The overall noise may for instance be portrayed simultaneously with graphs A–D, on a fifth screen (not shown). It may be convenient to have one or more auxiliary differential amplifiers on board, if board space permits. One use can be to sense and display synchromesh engagement times, such as of the gearboxes currently being evaluated for noise by the inventive combination. Such an auxiliary amplifier can measure the difference in two rpms as it approaches zero ("in sync"), or it can measure the time over which an acoustic signal note changes frequency or over which a pneumatic gear shifter drive was heavily loaded, i.e. the time to overcome the resistance of the synchromesh. However, the power supplies of the PC are not in general adequate to power all such auxiliaries.

Thus one auxiliary circuit board, according to the present invention, can thus convert a PC into a comprehensive and user friendly machinery noise test and display facility, by which the user's attention is concentrated on those noise components likely to be most disturbing and objectionable to humans or possibly to other specifics such as animals, acoustic-sensitive equipment or alarms. Also the system can simplify trouble-shooting and fault diagnostics.

Further information on Fourier analysis and enabling software can be obtained from various textbooks, such as:

J. W. Cooley & J. W. Tukey, "An Algorithm for the Machine Calculation of Complex Fourier Series", Math. of Comp., Vol 19, No. 90, pp 297–301, 1965. "Special Issue on the Fast Fourier Transform", IEEE Trans, Audio & Electroacoustics, Vol. AU-15, June 1967.

J. W. Cooley, P. A. W. Lewis & P. D. Welch, "The Fast Fourier Transform Algorithm: Programming Considerations in the Calculation of Sine, Cosine and Laplace Transforms", J. Sound Vib. (1970) Vol. 12 No. 3 pp. 315–337.

An idea of the noise sources in transmissions is given by: H. K. Kohler, A. Pratt & A. M. Thompson, "Dynamics and Noise of Parallel-axis Gearing" in Gearing in 1970, I. Mech. E., London, 1970.

The acoustic measurement specification can be obtained from IEC Publication 651, 1979 entitled Sonoméres/Sound Level Meters.

The foregoing discussion discloses and describes an exemplary embodiment of the present invention. One skilled in the art will readily recognize from such discussion, and from the accompanying drawings and claims, that various changes and modifications can be made therein without departing from the spirit and scope of the invention as defined in the following claims.

What is claimed is:

1. An apparatus for testing gearboxes for predetermined noise characteristics comprising:

a plurality of test instruments, each adapted to provide an output signal indicative of an operating condition of a gearbox under test as it is cycled through various speeds and gears, said test instruments including at least one microphone;

circuit means electrically coupled to said test instruments and adapted to selectively receive said test instrument output signals and at least one signal indicative of the operating speed of said gearbox;

processor means for providing the root mean square of said microphone output signal;

filter means electrically coupled to said circuit and processor means for selectively obtaining said root mean square determination at predefined frequencies to which the human ear is sensitive; and computer means for determining the filtered root mean square of the noise produced by the gearbox at varying operating speeds.

2. The apparatus of claim 1 further comprising a second microphone.

3. The apparatus of claim 1 wherein said filter means selects frequency components from response curves produced by at least one multiplexer under control of at least one timing pulse.

4. The apparatus of claim 1 wherein said frequencies are chosen based upon a noise sensitive portion of the human ear response and at least the second and third harmonics thereof.

5. The apparatus of claim 1 wherein said circuit includes a time base generator and wherein said time base generator is swept to generate varying signal sample rates.

6. The apparatus of claim 1 wherein said test instruments further include at least one of a dc tachometer, an accelerometer and a tachometer triggering means.

7. The apparatus of claim 1 further comprising means for simultaneously plotting noise with respect to frequency for a given gear ratio of said gearbox over a predefined audio range.

8. The apparatus of claim 7 further comprising means for plotting said noise over a frequency band wider than said predefined audio range.

9. The apparatus of claim 1 wherein said filter means includes an input A weighted filter.

10. A method of operating an apparatus for testing gearboxes for noise characteristics comprising:

providing a plurality of test instruments adapted to produce output signals indicative of operating characteristics of said gearbox, said test instruments including a microphone;

operating said gearbox at predetermined gears and speeds;

calculating the root mean square of the output signal produced by said microphone;

filtering said root mean square signal to obtain the noise produced by said gearbox at frequencies sensitive to the human ear; and relating said filtered noise signals to the speeds at which said gearbox is being operated.

* * * * *